United States Patent

Yang

(10) Patent No.: US 10,365,710 B2
(45) Date of Patent: Jul. 30, 2019

(54) HEAD-MOUNTED DISPLAY DEVICE CONFIGURED TO DISPLAY A VISUAL ELEMENT AT A LOCATION DERIVED FROM SENSOR DATA AND PERFORM CALIBRATION

(71) Applicant: SEIKO EPSON CORPORATION, Tokyo (JP)

(72) Inventor: Yang Yang, Richmond Hill (CA)

(73) Assignee: SEIKO EPSON CORPORATION, Tokyo (JP)

( * ) Notice: Subject to any disclaimer, the term of this patent is extended or adjusted under 35 U.S.C. 154(b) by 83 days.

(21) Appl. No.: 15/631,802

(22) Filed: Jun. 23, 2017

(65) Prior Publication Data

US 2018/0373318 A1    Dec. 27, 2018

(51) Int. Cl.
*G06F 3/01* (2006.01)
*G02B 27/01* (2006.01)

(52) U.S. Cl.
CPC ............ *G06F 3/011* (2013.01); *G02B 27/017* (2013.01); *G02B 27/0172* (2013.01); *G02B 2027/014* (2013.01); *G02B 2027/0138* (2013.01); *G02B 2027/0178* (2013.01)

(58) Field of Classification Search
CPC ...... G06T 19/006; H04N 13/00; G02B 27/01; G02B 27/017; G02B 27/101; G02B 27/64; G02B 27/0172; G02B 2027/0178; G02B 2027/014; G02B 2027/0138; G06F 3/011
See application file for complete search history.

(56) References Cited

U.S. PATENT DOCUMENTS

| 2012/0120103 A1* | 5/2012 | Border | G02B 27/017 345/633 |
| 2014/0176418 A1* | 6/2014 | Ramachandran | G01C 21/165 345/156 |
| 2016/0012643 A1* | 1/2016 | Kezele | G06T 19/006 345/633 |
| 2016/0371559 A1* | 12/2016 | Yang | G06K 9/4604 |

(Continued)

FOREIGN PATENT DOCUMENTS

| JP | 2005-038321 A | 2/2005 |
| JP | 2007-213407 A | 8/2007 |

OTHER PUBLICATIONS

James Powderly et al., U.S. Appl. No. 62/490,863 (Year: 2017).*

(Continued)

*Primary Examiner* — Chante E Harrison
(74) *Attorney, Agent, or Firm* — Oliff PLC

(57) ABSTRACT

A head-mounted display device includes: a camera; an inertial sensor in a fixed or adjustably fixed spatial relationship with the camera; a display; and a processor. The processor is configured to derive a first position of a feature element in an image frame in an image data sequence using an image frame, and derive a second position of the feature element using a sensor data sequence and the spatial relationship. The processor is further configured to display, with the display, a display image containing: i) a first visual element at a first location corresponding to the first position, and ii) a second visual element at a second location corresponding to the second position. The processor is further configured to perform calibration when a received signal indicates that the camera and inertial sensor are not sufficiently calibrated.

20 Claims, 11 Drawing Sheets

(56) References Cited

U.S. PATENT DOCUMENTS

2017/0011555 A1* 1/2017 Li .............................. G06T 1/60
2017/0295360 A1* 10/2017 Fu ........................ H04N 13/271
2017/0367766 A1* 12/2017 Mahfouz ................ A61B 34/10
2017/0371406 A1* 12/2017 Yang .......................... G06T 7/74
2018/0124387 A1* 5/2018 Zhao .................... H04N 17/002
2018/0150961 A1* 5/2018 Senthamil ......... G06F 17/30241
2018/0314406 A1* 11/2018 Powderly ............ G06F 3/04815

OTHER PUBLICATIONS

Lobo, J. et al., "Relative Pose Calibration Between Visual and Inertial Sensors.", Proceedings of the ICRA 2005 Workshop on Integration of Vision and Intertial Sensors, 2nd InerVis, (2005).

* cited by examiner

HEAD-MOUNTED DISPLAY DEVICE CONFIGURED TO DISPLAY A VISUAL ELEMENT AT A LOCATION DERIVED FROM SENSOR DATA AND PERFORM CALIBRATION

BACKGROUND

1. Technical Field

The disclosure relates generally to the field of augmented reality, and more specifically, calibration of an augmented reality device.

2. Related Art

Augmented Reality (AR) has become increasingly common with the advancement of computer technology. A general definition of AR is capturing a real-world scene and adding artificial (virtual) elements using software. This can enhance a user's perception of the real world or provide entertainment to the user.

Object tracking is important in many AR implementations. This means that a real-world object is "followed" by an artificial object, such as computer-graphics enhancements or an information bubble (as perceived by the user). In other words, if the real-world object moves, or the user's view moves relative to the real-world object, the artificial object will remain in the same location relative to the real-world object. Location tracking is also important in many AR implementations. This means that a virtual object will stay in one location in the scene, regardless of the movement of the user.

One platform for implementing AR is the smartphone. The presence of a camera, display, and processor on the same device allows for software to easily add artificial elements to a live scene captured by the camera. Moreover, the presence of motion sensors and locators (e.g. accelerometers and GPS) on these devices is exploited by the software to better implement AR.

Although smartphones provide a simple and convenient platform for implementing AR, they do not provide a very immersive experience for the user. This is because the user's eyes are spatially separated from the smartphone, and instead of perceiving the environment with their own eyes, they are viewing the scene as captured by the camera.

To improve on the AR experience, the transparent head-mounted display (HMD) can implement AR. These systems are usually glasses with prisms placed in front of the eyes. The user views the scene directly through the glasses. The prisms allow for artificial images to be overlaid on the scene as perceived by the user. Meanwhile, the HMD collects data from the scene using a camera.

If only optical tracking using the camera is used to track real-world objects, the tracking can become inaccurate. In a case in which an angular velocity of head rotation is fast and/or an angle of the rotation is large, a time difference (delay time) is apparent between the relative movement of the actual object and the relative movement of the virtual object.

Technically, it is easier to improve a resolution of an inertial sensor than a time resolution of a tracking camera (a frame rate of an image), especially where computational resources are limited. Accordingly, to address the problem of delay time, motion sensors are used in conjunction with the camera to predict relative motion of the HMD and the environment.

SUMMARY

Implementing AR on a head-mounted display has different challenges than a smartphone for several reasons. First, glasses are not normally equipped with a processor, power supply, motion sensors, camera, or locators. These devices may be hard to integrate with the glasses. Second, the camera and motion/location sensors should be calibrated to each other so that object tracking and location tracking function at a high level of accuracy that is convincing to the user. Third, the eyes of the user are a complex and totally separate optical system from that of the head-mounted display. Because of this complexity, each user may have different subjective perceptions of the relative locations of the artificial images and external scenery. Moreover, components such as motion (inertial) sensors and cameras may change properties over time and require recalibration. Also, if the HMD has a moveable camera, calibration will have to be updated when the camera is moved. Finally, precise movement of artificial images relative to the environment is very important to ensure a quality AR experience for the user.

As a result, end-user or post-production calibration is desirable. The existing head-mounted display AR systems are difficult to calibrate by end-users. This difficulty can manifest in poor calibration results, a frustrating user experience performing the calibration itself, and often both. Also, many devices include a default calibration mean to provide basic calibration for the same model of head-mounted display or device. It is advantageous for the user to be able to improve on the default calibration to tune the calibration for their specific device. As such, there is a need in the art for a more easy and effective calibration method for head-mounted displays.

In view of the above, exemplary embodiments of the broad inventive concepts described herein provide a method of calibrating a relationship between a camera and an inertial sensor in a fixed or adjustably fixed spacial relationship with the camera, of a head-mounted display. The head-mounted display has a storage medium containing a first spatial relationship between the camera and the inertial sensor that was derived using: images of a real marker in a first and a second pose taken using the head-mounted display or another device, and a difference in pose between the first pose and the second pose acquired based on inertial sensor output of the head-mounted display or the other device. The method includes acquiring, from the camera, an image data sequence. The method further includes acquiring, from the inertial sensor, a sensor data sequence. The method further includes deriving, by a processor, a first position of a feature element in an image frame in the image data sequence using the image frame. The method further includes deriving a second position of the feature element using the sensor data sequence and the first spatial relationship. The method further includes outputting, to a display, a display image containing: i) a first visual element at a first location corresponding to the first position, and ii) a second visual element at a second location corresponding to the second position. The method further includes receiving a signal indicating whether the camera and inertial sensor are calibrated based on a difference between the first location and the second location. The method further includes performing calibration when the received signal indicates that the camera and inertial sensor are not sufficiently calibrated.

In some embodiments, the method further includes: calculating, by the processor, the difference between the first location and the second location after displaying the display image; and generating, by the processor, a non-calibration signal indicating that the camera and inertial sensor are not sufficiently calibrated when the difference is higher than a predetermined threshold. In some embodiments, the signal is received from a user of the head-mounted display. In some embodiments, calibration is performed by adjusting a stored relationship between sensor data from the inertial sensor and image data from the camera. In some embodiments, the stored relationship includes rotational relationships on three axes. In some embodiments, the performing calibration includes: receiving inputs from a user of head-mounted display while adjusting one of the camera or inertial sensor; receiving a final input from the user indicating proper calibration; and setting the stored relationship in response to receiving the final input. In some embodiments, the adjustment is performed by the processor. In some embodiments, the camera and inertial sensor are moved before the first and second positions of the feature element are derived. In some embodiments, the method further includes deriving an initial position of the feature element in an earlier image frame in the image data sequence using the earlier image frame before deriving the first and second positions of the feature element, and the second position of the feature element is derived using the initial position of the feature element. In some embodiments, the method further includes sending an instruction to move the camera and inertial sensor before the camera and inertial sensor are moved.

Exemplary embodiments provide a non-transitory storage medium containing a first spatial relationship between a camera and an inertial sensor in a fixed or adjustably fixed spatial relationship with the camera, that was derived using: images of a real marker in a first and a second pose taken using a device, and a difference in pose between the first pose and the second pose acquired based on inertial sensor output of the device. The non-transitory storage medium further contains program instructions that, when executed by a computer processor, cause the computer processor to perform a method. The method includes acquiring an image data sequence from a camera connected to the processor, and acquiring a sensor data sequence from an inertial sensor that is connected to the processor. The method further includes deriving a first position of a feature element in an image frame in the image data sequence using the image frame, and deriving a second position of the feature element using the sensor data sequence and the spatial relationship. The method further includes displaying, with a display connected to the processor, a display image containing: i) a first visual element at a first location corresponding to the first position, and ii) a second visual element at a second location corresponding to the second position. The method further includes receiving a signal indicating calibration between the camera and inertial sensor based on a difference between the first location and the second location.

In some embodiments, the method further includes performing calibration when a non-calibration signal is received indicating that the camera and inertial sensor are not properly calibrated. In some embodiments, the method further includes: calculating the difference between the first location and the second location after displaying the display image; and generating a non-calibration signal indicating that the camera and inertial sensor are not properly calibrated when the difference is higher than a predetermined threshold. In some embodiments, the signal is received from a user of the camera and inertial sensor. In some embodiments, the method further includes deriving an initial position of the feature element in an earlier image frame in the image data sequence using the earlier image frame before deriving the first and second positions of the feature element, and the second position of the feature element is derived using the initial position of the feature element.

Exemplary embodiments provide a head-mounted display device including: a camera and an inertial sensor in a fixed or adjustably fixed spatial relationship with the camera. The head-mounted display device further includes a storage medium containing a first spatial relationship between the camera and the inertial sensor that was derived using: images of a real marker in a first and a second pose taken using the head-mounted display or another device, and a difference in pose between the first pose and the second pose acquired based on inertial sensor output of the head-mounted display or another device. The head-mounted display further includes a display and a processor. The processor is configured to: acquire an image data sequence from the camera and acquire a sensor data sequence from the inertial sensor. The processor is further configured to derive a first position of a feature element in an image frame in the image data sequence using the image frame, and derive a second position of the feature element using the sensor data sequence and the spatial relationship. The processor is further configured to display, with the display, a display image containing: i) a first visual element at a first location corresponding to the first position, and ii) a second visual element at a second location corresponding to the second position. The processor is further configured to receive a signal indicating calibration between the camera and inertial sensor based on a difference between the first location and the second location. The processor is further configured to perform calibration when the received signal indicates that the camera and inertial sensor are not sufficiently calibrated.

In some embodiments, the processor is further configured to perform calibration when a non-calibration signal is received indicating that the camera and inertial sensor are not properly calibrated. In some embodiments, the processor is further configured to calculate the difference between the first location and the second location after displaying the display image, and generate a non-calibration signal indicating that the camera and inertial sensor are not properly calibrated when the difference is higher than a predetermined threshold. In some embodiments, the signal is received from a user of the head-mounted display device. In some embodiments, the processor is further configured to derive an initial position of the feature element in an earlier image frame in the image data sequence using the earlier image frame before deriving the first and second positions of the feature element, and the second position of the feature element is derived using the initial position of the feature element.

The above embodiments can achieve an end-user calibration system that is relatively quick and easy to perform while achieving highly precise results.

DESCRIPTION OF EXEMPLARY EMBODIMENTS

Figure 1:
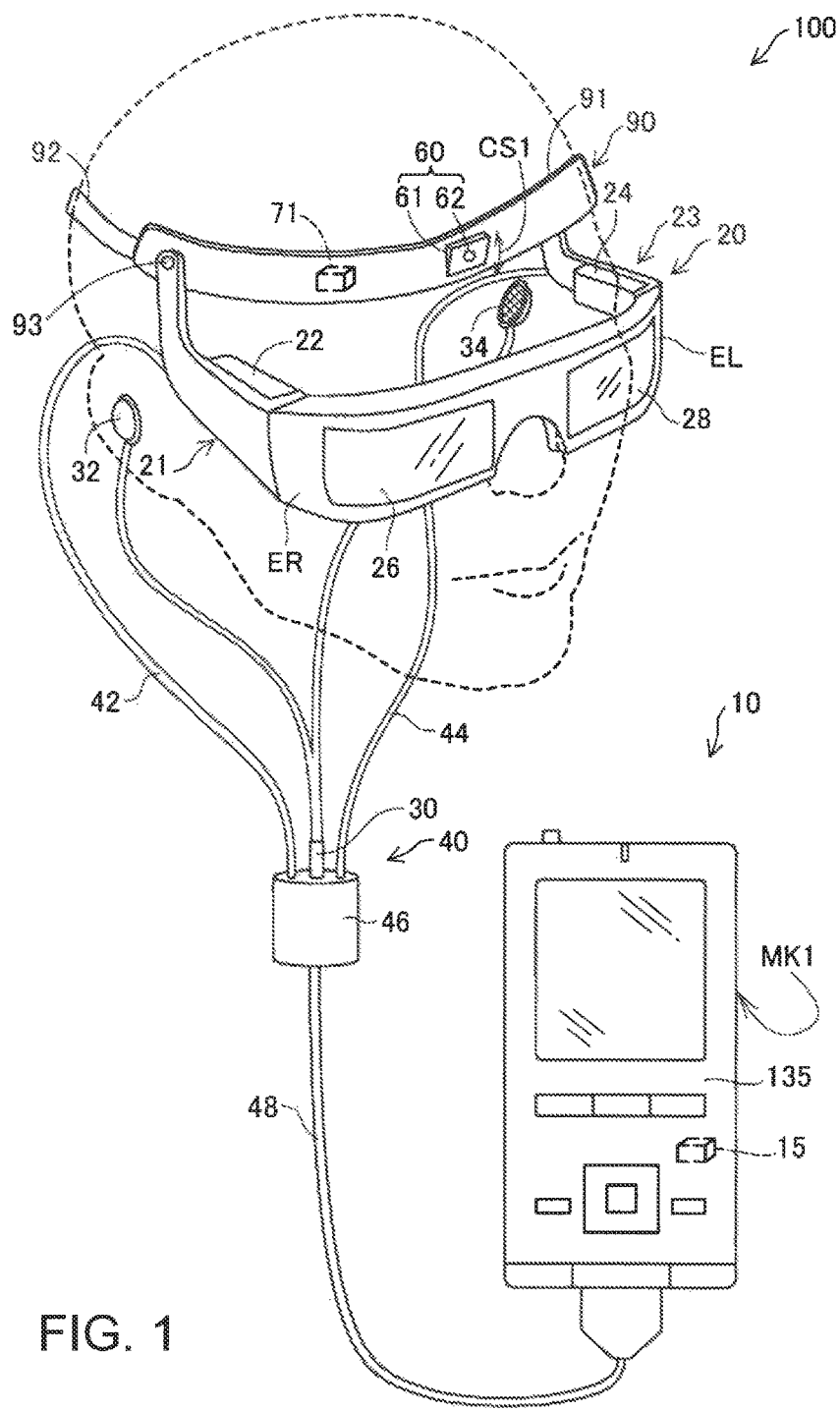
FIG. 1 is a diagram illustrating a schematic configuration of an HMD, according to an embodiment.

FIG. 1 is a diagram illustrating a schematic configuration of an HMD 100. The HMD 100 is a head mounted display. The HMD 100 is an optical transmission type head mounted display which enables a user to view a virtual image and to simultaneously view outside scenery directly. The HMD 100 includes a camera 60 that collects image data from the outside scenery so that the HMD 100 can display relevant virtual images.

In this embodiment, the HMD 100 includes a fitting band 90 that is fitted on the head of a user, a display portion 20 that displays images, and a controller 10 that controls the display portion 20. The display portion 20 enables the user to view a virtual image when the display portion 20 is fitted on the head of the user.

The fitting band 90 includes a fitting base portion 91 formed, in this embodiment, of a resin, a fabric belt portion 92 connected to the fitting base portion 91, a camera 60, and an inertial sensor (Inertial Measurement Unit; IMU) 71. The fitting base portion 91 has a curved shape matched to a person's forehead. The belt portion 92 is a belt that is fitted around the head of the user. In other embodiments, the camera 60 and IMU 71 are directly integrated with a frame of display portion 20.

The camera 60 can image outside scenery and is disposed in a middle portion of the fitting base portion 91 in this embodiment. In other words, the camera 60 is disposed at a position corresponding to the middle of the forehead of the user in a state in which the fitting band 90 is fitted on the head of the user. Therefore, in the state in which the user fits the fitting band 90 on the head of the user, the camera 60 images outside scenery which is external scenery in a visual line direction of the user and acquires a captured image by imaging.

In this embodiment, the camera 60 includes a camera base portion 61 that is rotated with respect to the fitting base portion 91 and a lens portion 62 of which a relative position to the camera base portion 61 is fixed. When the fitting band 90 is fitted on the head of the user, the camera base portion 61 is disposed to be rotatable along an arrow CS1 which is a predetermined range of an axis included in a plane including a central axis of the user. Therefore, the direction of an optical axis of the lens portion 62 which is an optical axis of the camera 60 can be changed within the range of the arrow CS1. The lens portion 62 images a range which is changed by zoom about the optical axis.

The IMU 71 is an inertial sensor that detects acceleration. In some embodiments, the IMU 71 can detect an angular velocity and geomagnetism in addition to acceleration. In this embodiment, the IMU 71 is contained in the fitting base portion 91. Therefore, the IMU 71 detects acceleration, angular velocities, and geomagnetism of the fitting band 90 and the camera base portion 61.

Since a relative position of the IMU 71 to the fitting base portion 91 is fixed, the camera 60 is movable with respect to the IMU 71. Thus, IMU 71 has an adjustably fixed spatial relationship with camera 60. Further, since a relative position of the display portion 20 to the fitting base portion 91 is fixed, a relative position of the camera 60 to the display portion 20 is movable.

The display portion 20 is connected to the fitting base portion 91 of the fitting band 90 and has a glasses shape in this embodiment. The display portion 20 includes a right holder 21, a right display driver 22, a left holder 23, a left display driver 24, a right optical image display 26, and a left optical image display 28. The right optical image display 26 and the left optical image display 28 are located in front of the right and left eyes of the user when the display portion 20 is fitted on the user. One end of right optical image display 26 and one end of left optical image display 28 are connected to each other at a position corresponding to the middle of the forehead of the user when the display portion 20 is fitted on the user.

The right holder 21 has a shape which extends from an end portion ER which is the other end of the right optical image display 26 in a substantially horizontal direction and is inclined upward obliquely from the middle of the shape and connects the end portion ER to a right connector 93 of the fitting base portion 91. Similarly, the left holder 23 has a shape which extends from an end portion EL which is the other end of the left optical image display 28 in a substantially horizontal direction and is inclined upward obliquely from the middle of the shape and connects the end portion EL to a left connector (not illustrated) of the fitting base portion 91. The right holder 21 and the left holder 23 are connected to the fitting base portion 91 by the right and left connectors 93, and thus the right optical image display 26 and the left optical image display 28 are located in front of the eyes of the user. The connectors 93 connect the right holder 21 and the left holder 23 to be rotatable and fixable at any rotation positions. As a result, the display portion 20 is installed to be rotatable with respect to the fitting base portion 91 in this embodiment.

The right holder 21 is a member installed to extend from the end portion ER which is the other end of the right optical image display 26 to a position corresponding to a temporal region of the user when the display portion 20 is fitted on the user. Similarly, the left holder 23 is a member installed to extend from the end portion EL which is the other end of the left optical image display 28 to a position corresponding to a temporal region of the user when the display portion 20 is fitted on the user. In this embodiment, the right display driver 22 and the left display driver 24 are disposed on sides facing the head of the user when the display portion 20 is fitted on the user.

The display drivers 22 and 24 include liquid crystal displays 241 and 242 (hereinafter also referred to as "LCDs 241 and 242") and projection optical systems 251 and 252 to be described below with respect to FIG. 4. The details of the configurations of the display drivers 22 and 24 will be described below.

The optical image displays 26 and 28 include light-guiding plates 261 and 262 (see FIG. 4) and light adjustment plates to be described below. The light-guiding plates 261 and 262 are formed of a light transmission resin material or the like and guide image light output from the display drivers 22 and 24 to the eyes of the user. In some embodiments, image displays 26 and 28 include prisms in addition to or substituting light guiding plates 261 and 262. The light adjustment plates are optical elements with a thin plate shape and are disposed to cover the front side of the display portion 20 which is an opposite side to the side of the eyes of the user. By adjusting light transmittance of the light adjustment plates, it is possible to adjust the amount of external light entering the eyes of the user and adjust easiness of view of a virtual image. This may be useful to adjust for varying lighting conditions (e.g. indoor v. outdoor lighting levels) while maintaining visibility of the virtual image.

The display portion 20 further includes a connection portion 40 connecting the display portion 20 to the controller 10. The connection portion 40 includes a body cord 48 connected to the controller 10, a right cord 42, a left cord 44, and a connection member 46. The right cord 42 and the left cord 44 are two branched cords of the body cord 48. The display portion 20 and the controller 10 transmit various signals via the connection portion 40. In the right cord 42, the left cord 44, and the body cord 48, for example, a metal cable or an optical fiber can be used.

Figure 4:
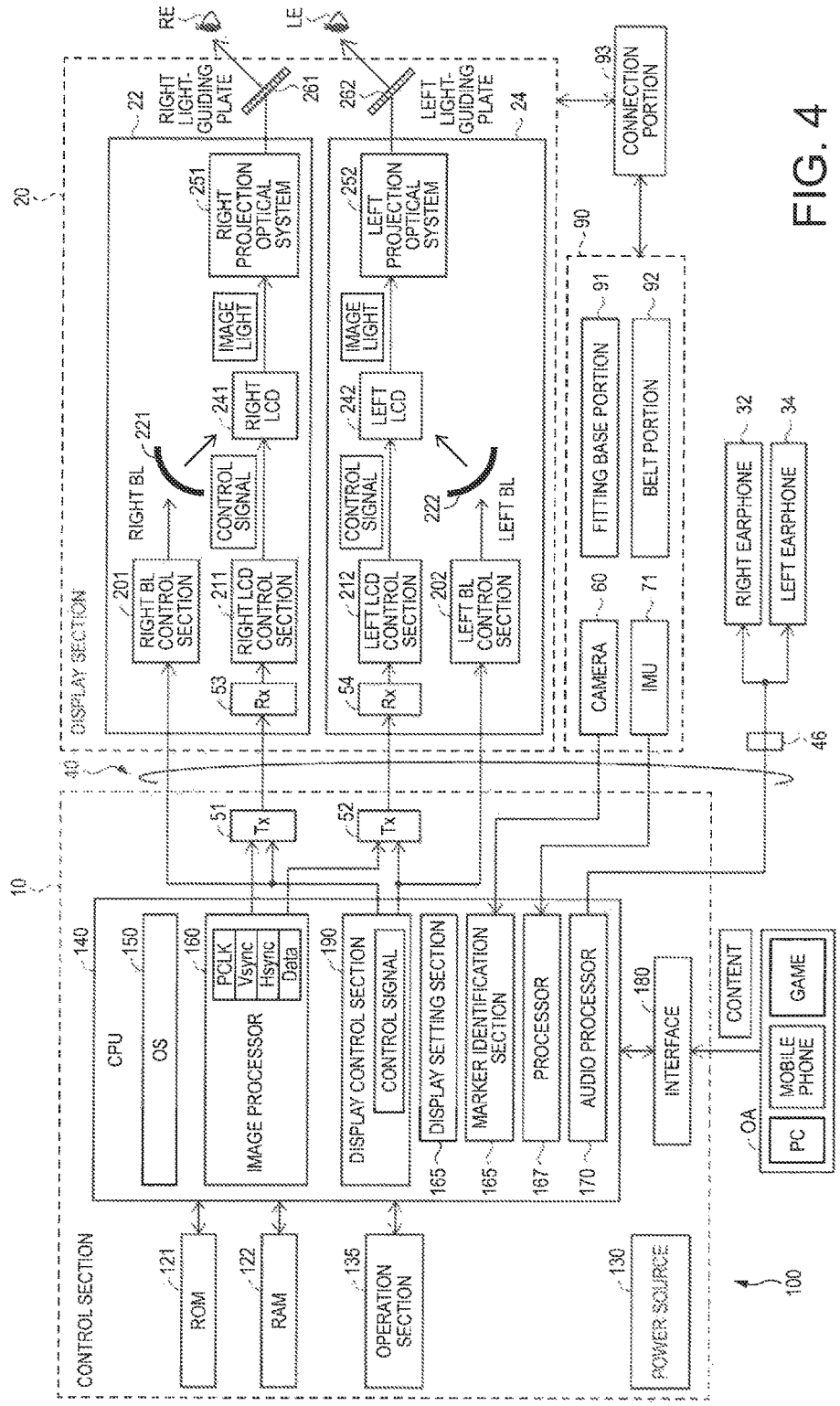
FIG. 4 is a block diagram illustrating a functional configuration of the HMD, according to an embodiment.

FIG. 4 is a block diagram illustrating a functional configuration of the HMD 100. As illustrated in FIG. 4, the controller 10 includes a ROM 121, a RAM 122, a power source 130, the operation section 135, an identification target storage section 139, a CPU 140, an interface 180, a transmission section 51 (Tx 51), and a transmission section 52 (Tx 52).

The power source 130 feeds power to each section of the HMD 100. The ROM 121 stores various programs. The CPU 140 executes various programs by loading the various programs stored in the ROM 121 on the RAM 122.

The interface 180 is an input and output interface that connects various external devices OA which are content supply sources to the controller 10. Examples of the external devices OA include a storage device storing an AR scenario, a personal computer (PC), a mobile phone terminal, and a game terminal. Examples of the interface 180 include a USB interface, a micro USB interface, a memory card interface, and a video interface (e.g. DisplayPort, HDMI, etc . . . ).

The CPU 140 loads programs stored in the ROM 121 on the RAM 122 to function as an operating system 150 (OS 150), a display controller 190, an audio processor 170, an image processor 160, a marker identification section 165, and a processor 167.

The display controller 190 generates control signals to control the right display driver 22 and the left display driver 24. The display controller 190 controls generation and emission of image light in accordance with each of the right display driver 22 and the left display driver 24. The display controller 190 transmits control signals for the right LCD controller 211 and the left LCD controller 212 via the transmission sections 51 and 52, respectively. The display controller 190 transmits control signals for a right backlight controller 201 and a left backlight controller 202.

As illustrated in FIG. 4, the display portion 20 includes the right display driver 22, the left display driver 24, the right light-guiding plate 261 serving as the right optical image display 26, and the left light-guiding plate 262 serving as the left optical image display 28.

The right display driver 22 includes the reception section 53 (Rx 53), a right backlight controller 201, a right backlight 221, a right LCD controller 211, the right LCD 241, and the right projection optical system 251. The right backlight controller 201 and the right backlight 221 function as a light source. The right LCD controller 211 and the right LCD 241 function as a display element. In another embodiment, instead of the foregoing configuration, the right display driver 22 may include a spontaneous emission type display element such as an organic EL display element or may include a scan type display element that scans an optical beam from a laser diode on a retina. The same also applies to the left display driver 24.

The reception section 53 functions as a receiver that performs serial transmission between the controller 10 and the display portion 20. The right backlight controller 201 drives the right backlight 221 based on an input control signal. The right backlight 221 is, for example, an emitter such as an LED or an electroluminescence (EL). The right LCD controller 211 drives the right LCD 241 based on control signals transmitted from the image processor 160 and the display controller 190. The right LCD 241 is a transmission type liquid crystal panel in which a plurality of pixels is arrayed in a matrix form.

The right projection optical system 251 is configured to include a collimating lens that forms image light emitted from the right LCD 241 as a light flux in a parallel state. The right light-guiding plate 261 serving as the right optical image display 26 guides the image light output from the right projection optical system 251 to the right eye RE of the user while reflecting the image light along a predetermined light path. The left display driver 24 has the same configuration as the right display driver 22 and corresponds to the left eye LE of the user, and thus the description thereof will be omitted.

The image processor 160 acquires an image signal included in content and transmits the acquired image signal to reception sections 53 and 54 of the display portion 20 via the transmission sections 51 and 52. The audio processor 170 acquires an audio signal included in the content, amplifies the acquired audio signal, and supplies the amplified audio signal to a speaker (not illustrated) inside the right earphone 32 and a speaker (not illustrated) inside the left earphone 34 connected to the connection member 46.

The controller 10 is a device that controls the HMD 100. In some embodiments, controller 10 is integrated into the display portion 20 and/or the fitting band 90. In other embodiments, controller 10 is implemented on a separate computer. The controller 10 includes an operation section 135 that includes an electrostatic track pad or a plurality of buttons which can be pressed and a real marker MK that is used for calibration in imaging. The operation section 135 is disposed on the front surface of the controller 10. In other embodiments, a portion of operation section 135, or the entirety thereof, is disposed on a frame of display portion 20 and/or fitting band 90. The MK is disposed on the back surface of the controller 10. Therefore, the real marker MK is not illustrated in FIG. 1. The details of the real marker MK will be described below.

In another embodiment, the real marker MK is printed and affixed to a fixed location, such as on a wall in front of a user. In this embodiment, the real marker remains stationary while the user can move during the calibration process.

Figures 2A, 2B:
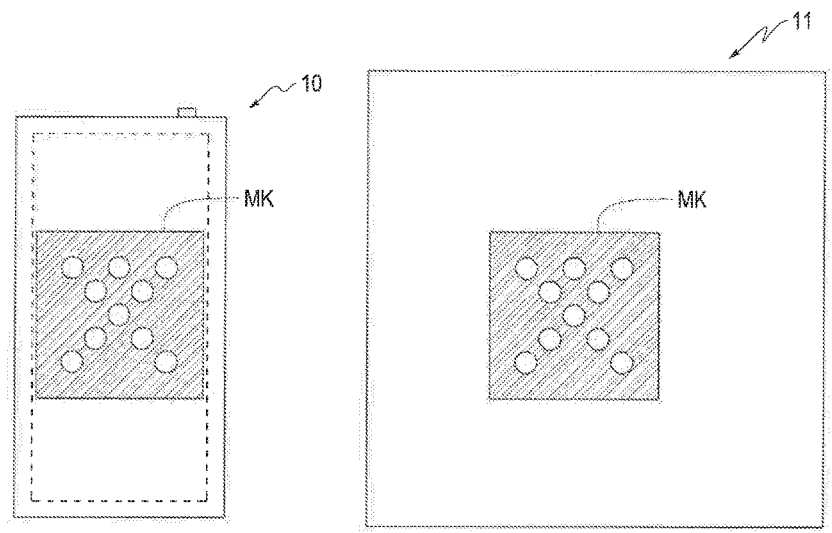
FIGS. 2A and 2B are schematic diagrams illustrating a real marker according to two embodiments.
Figure 3:
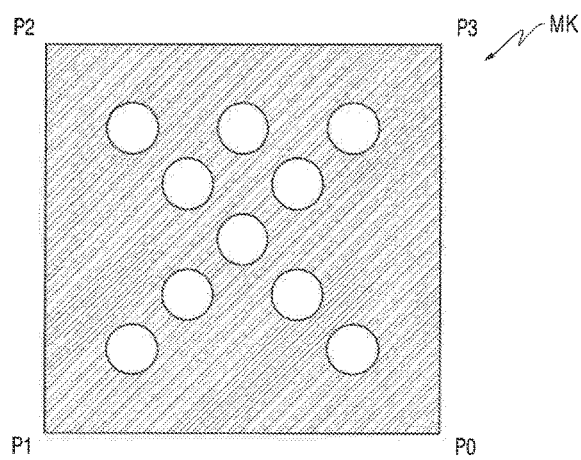
FIG. 3 is a detailed diagram illustrating the real marker, according to an embodiment.

FIG. 2A is a schematic diagram illustrating the real marker MK disposed or displayed on a surface of the controller 10, according to one embodiment, while FIG. 2B is a schematic diagram illustrating the real marker MK disposed on a surface of a fixed location 11 (e.g., a wall), according to one embodiment. FIG. 3 is a more detailed diagram illustrating the real marker MK. As illustrated in FIGS. 2A and 2B, the real marker MK may be disposed or displayed on the rear surface of the controller 10 or placed or displayed on a fixed location. As illustrated in FIG. 3, the real marker MK is a 2-dimensional marker in which 10 circles are formed in a square. In a conversion parameter calculation process to be described below, the degree of superimposition between the real marker MK imaged by the camera 60 and a marker image IMG (to be described below) is determined by using coordinate values of centers of white circles.

The marker identification section 165 identifies the real marker MK in an image captured by the camera 60, and locates the real marker MK within the image (i.e. the field of view of the camera 60). The feature points of the marker image IMG are 10 white circles in this embodiment.

In a case in which the real marker MK is extracted by the marker identification section 165, for example, the processor 167 calculates a marker pose using, for example, a nomography matrix. A spatial relationship (rotational relationship) between the camera 60 and the real marker MK is calculated with the marker pose. As will be described below, the processor 167 calculates a rotational matrix for converting a coordinate system fixed to the camera into a coordinate system fixed to the IMU 71 using the calculated spatial relationship and a detected value such as acceleration detected by the IMU 71.

The precision of calibration performed using the IMU 71 and the camera 60 is different according to the performance of the IMU 71 which is an inertial sensor. When a less precise IMU of which precision is not high is used, a large error or drift can occur in calibration in some cases.

In one embodiment, calibration is performed by a batch solution base algorithm using a multi-position method using the IMU 71. In one embodiment, design data at the time of manufacturing is used for a translational relationship between the IMU 71 and the camera 60. The multi-position method has the following advantages (A) to (D) when the calibration is performed.

(A) Since the detection of the IMU 71 and the imaging of the camera 60 are performed at a static position, there is no problem in time synchronization.

(B) by using the detected value or the captured image at the plurality of positions, it is possible to reduce noise of the IMU 71 (each sensor included in the IMU 71) and the camera 60 through filtering.

(C) Since outputs of the gyro sensor, the acceleration sensor, and the geomagnetic sensor in the IMU 71 are fused and the pose of the IMU 71 (hereinafter referred to as an IMU orientation) is obtained, the drift of each sensor is corrected and the IMU orientation is highly precise.

(D) The real marker MK disposed on the controller 10 or another surface is used, and thus a device performing complicated calibration or another device other than the HMD 100 is not necessary.

Before a calibration process (to be described below with FIG. 7), another calibration (hereinafter referred to as independent calibration or factory calibration) may be performed on the IMU 71 and the camera 60. A technology generally widely known may be used as a specific independent calibration method, and the description thereof will be omitted in the present specification. The factory calibration, plus the off-line or customization calibration results in the final calibration parameters which are used to operate the HMD.

In the independent calibration, the IMU 71 is calibrated. Specifically, for a triaxial acceleration sensor (Ax, Ay, Az), a triaxial gyro sensor (Gx, Gy, Gz), and a triaxial geomagnetic sensor (Mx, My, Mz) included in the IMU 71, gain/scale, static bias/offset, and skew between three axes are calibrated.

When such calibration is performed, the IMU 71 outputs acceleration, an angular velocity, and geomagnetism as output values of the acceleration, the angular velocity, and the geomagnetism. Such output values are values obtained by correcting a gain, static bias/offset, and misalignment between three axes. The calibration is performed at a manufacturing factory or the like when the HMD 100 is manufactured in the embodiment.

In the calibration of the camera 60 performed through the independent calibration, intrinsic parameters of the camera 60 including a focal distance, skew, a main point position, and distortion in the camera 60 are calibrated. A known technology can be applied to the calibration of the camera 60.

After the calibration of each sensors included in the IMU 71 is performed, detected values (measured outputs) of the acceleration, the angular velocity, and the geomagnetism of the sensors in the IMU 71 are fused, and thus high precise IMU orientation can be obtained. This fusion means that measured movement values from the sensors are merged with predicted values in order to provide a smoother and more accurate final sensor output.

Figure 5:
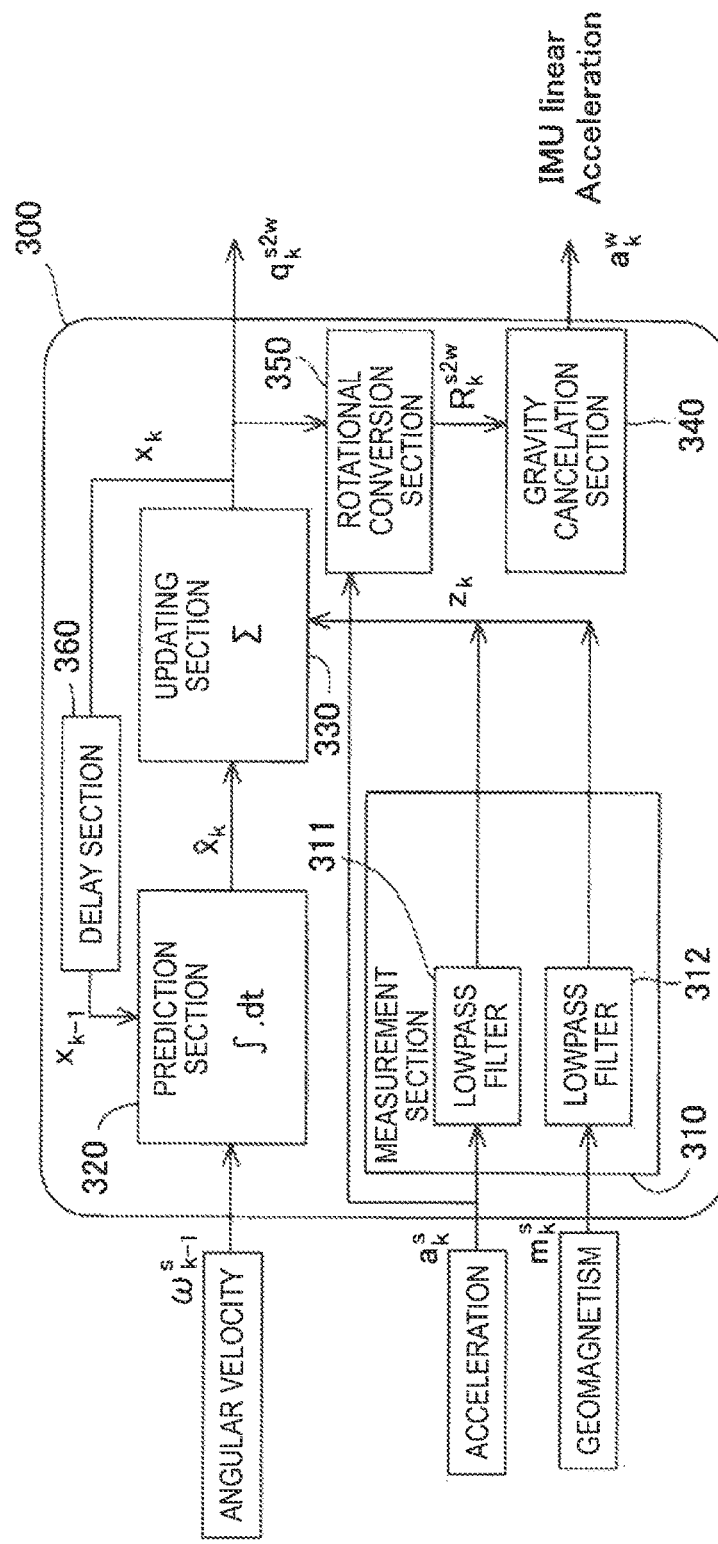
FIG. 5 is a block diagram illustrating a fusion section in an inertial sensor, according to an embodiment.

FIG. 5 illustrates the fusion section 300 in the IMU 71. The fusion section 300 may be present outside the IMU 71. The fusion section 300 fuses measures (values or signals) of the internal sensors based on an expanded Kalman filter (EKF). In this embodiment, the IMU orientation is noted by quaternion. The notation by quaternion can be converted into a rotational matrix. The extended Kalman filter is applied to a state vector expressed as follows.

$$X=[q_{s2w}, b_{gyro}] \quad (a)$$

A control input vector is decided by an input of the gyro sensor.

$$u=[w^s] \quad (b)$$

A state transition model from K−1 to K at an interval Δt is expressed in the following equation.

$$x_k=f(x_{k-1},u_{k-1},w_{k-1}) \quad (c)$$

Here, $w_{k-1}$ is a noise vector.

As illustrated in FIG. 5, the fusion section 300 includes a measurement section 310, a prediction section 320, an updating section 330, a gravity cancellation section 340, a rotational conversion section 350, and a delay section 360.

The measurement section 310 functions based on measurements $a^s_k$ and $m^s_k$ of acceleration output from the acceleration sensor and geomagnetism output from the geomagnetic sensor. The measurement section 310 includes lowpass filters 311 and 312. The lowpass filter 311 reduces noise of the measured acceleration $a^s_k$. The lowpass filter 312 reduces noise of the measured geomagnetism $m^s_k$.

The prediction section 320 estimates an amount (or a pose) of angle change by integrating angular velocities $\omega^s_{k-1}$ detected for a predetermined time and outputs the predicted angle change (or pose) to the updating section 330. The updating section 330 filters, that is, fuses measures $z_k$ (acceleration and geomagnetism) using the predicted angle change (or pose). Then, the fused IMU orientation $q^{s2w}_k$ is updated and output. The fused IMU orientation $q^{s2w}_k$ is fed back to the prediction section 320 via the delay section 360 for the purpose of a subsequent cycle. When the fused IMU orientation $q^{s2w}_k$ is calculated, a dynamic or linear acceleration $a^w_k$ of the IMU 71 is calculated through cancellation of gravity by the gravity cancellation section 340.

The rotational conversion section 350 receives the IMU orientation $q^{s2w}_k$, converts the IMU orientation $q^{s2w}_k$ into a rotational matrix $R^{s2w}_k$, and outputs the rotational matrix $R^{s2w}_k$. The acceleration $a^s_k$ measured from the acceleration sensor is input to the gravity cancellation section 340. The gravity cancellation section 340 cancels the gravitational acceleration of the earth using the IMU orientation expressed by the rotational matrix $R^{s2w}_k$, and then calculates and outputs a linear acceleration $a^w_k$ of the IMU 71 not included in the component of the gravitational acceleration.

Adjustment for the fusion of the detected values based on the above-described extended Kalman filter can be performed at a factory at which the HMD 100 is manufactured. The initial calibration of the camera 60 and the IMU 71 can also be performed at a factory at which the HMD 100 is manufactured.

After fusion of predicted sensor data with presently collected sensor data as shown in FIG. 5, the fused sensor data is further fused with camera tracking data. According to the embodiment in FIG. 9, the CPU 140 operates two separate threads, one processing data from the IMU 71 and one processing data from the camera 60. Information is exchanged between the two threads in order to fuse the camera data and the IMU data. The fusion of the camera data and the IMU data allows for more accurate object location tracking because the IMU data can be processed much more quickly (e.g. at 125 Hz) than the image data (e.g. 30 fps or 30 Hz). Thus, there will be less latency in the object tracking.

It should be understood that the term "camera data" may refer to data taken by a camera 60, but should not be limited to camera and can be taken by any other imaging device. As such the term "camera data" should not be limited to data taken only by a camera. As such, the term "camera data" may be referred to herein as "image data."

Similarly, it should be understood that the term "IMU data" may refer to data taken by an IMU 71, but should not be limited to an IMU and can be obtained by other motion sensing devices. As such, the term "IMU data" should not be limited to data obtained only by an IMU. Accordingly, the term "IMU data" may be referred to herein as "sensor data."

Figure 9:
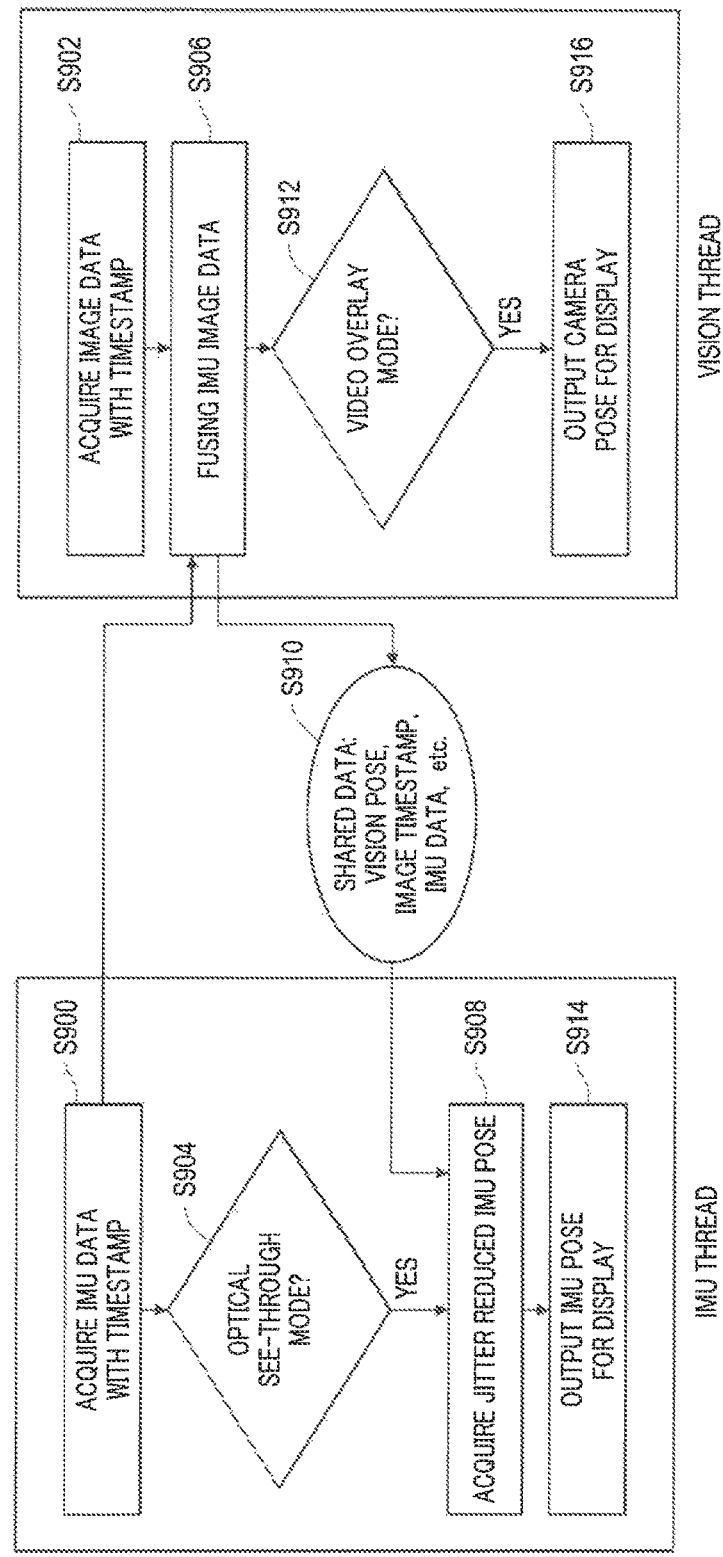
FIG. 9 is a flowchart showing fusion of fused sensor data with image data to predict object location, according to an embodiment.

Referring still to FIG. 9, fusion is accomplished by placing timestamps on both the sensor data and the image data. This way, a precise timing of both the sensor data and the image data is known and they can be matched to each other, resulting in fusion of data from the same time. Thus, in steps S900 and S902, IMU data and image data are acquired with timestamps. Subsequently image data and IMU data are fused in the vision thread in step S906. In the IMU thread, S904 confirms that the HMD is in see-through mode. See-through mode is a mode in which the user simultaneously views the external environment and virtual image data. In some embodiments, the HMD 100 is capable of operating in a non-see-through mode, in which the display area is covered by a virtual image and the user is intended to focus solely on the virtual image. Once see-through mode is confirmed, the fused data from S906 is transmitted from the vision thread to the IMU thread in S910.

On the other hand, the CPU 140 performs a calibration process (to be described below with FIGS. 6-8 and 10-12). The calibration process is a process of performing offline calibration of the HMD 100. In the offline calibration, a rotational matrix $R_{cam2imu}$ from the coordinate system fixed to the camera 60 to the coordinate system fixed to the IMU 71 is derived. The rotational matrix $R_{cam2imu}$ indicates a spatial relationship between the camera 60 and the IMU 71. The subscript cam2imu means camera to IMU. The derivation and tuning of the rotational matrix $R_{cam2imu}$ is one purpose of this embodiment. Next, the rotational matrix $R_{cam2imu}$ will be described. $R_{cam2imu}$ represents the relationship between camera 60 and IMU 71.

Calibration between camera 60 and IMU 71 should be performed because controller 10 fuses the fused sensor data with the image-based location prediction data, as described above in connection with FIG. 9.

Figure 6:
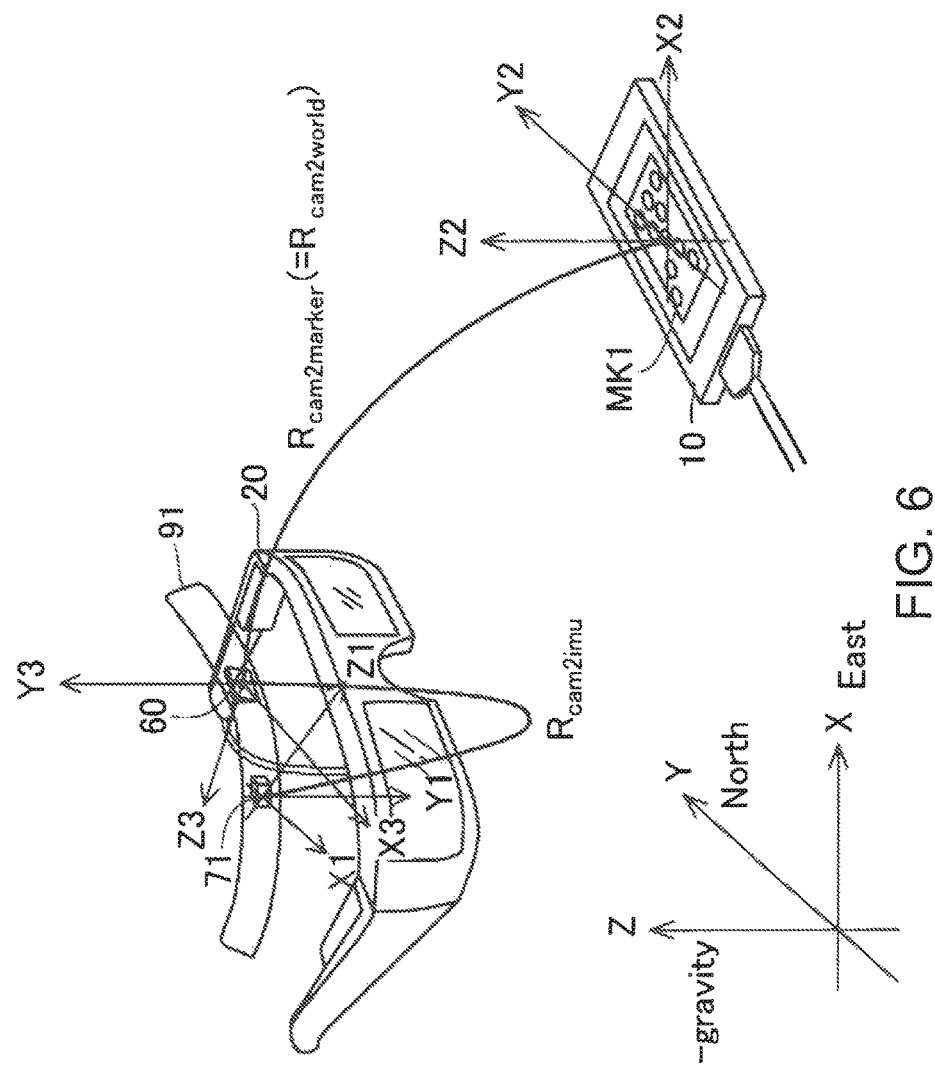
FIG. 6 is a schematic diagram illustrating a positional relationship between a camera and the real marker, according to an embodiment.

FIG. 6 is a schematic diagram illustrating a positional relationship between the camera 60 and the real marker MK in a case in which the real marker MK is imaged for purposes of performing offline calibration. FIG. 6 illustrates the display portion 20, the fitting base portion 91 which is a part of the fitting band 90, the camera 60, the IMU 71 contained and fixed in the fitting base portion 91, and the controller 10. FIG. 6 illustrates the rotational matrix $R_{cam2imu}$ from a camera coordinate system (X3-Y3-Z3) to the IMU coordinate system (X1-Y1-Z1) and a rotational matrix $R_{cam2marker}$ from the camera coordinate system to a marker coordinate system (X2-Y2-Z2). Here, in a case in which it is satisfied the condition that the controller 10 is not moved in the earth, $R_{cam2marker}$ is fixed to $R_{cam2world}$. $R_{cam2world}$ is a rotational matrix from the camera coordinate system to a world coordinate system (absolute coordinate system: X-Y-Z). The world coordinate system is a coordinate system fixed to the earth.

In order to acquire an observed second location (later referred to as $R_{camA2B}^{Obs}$ and the first position) and a predicted second location (later referred to as $R_{camA2B}^{Pred}$ and the second position) to perform calibration, it is necessary to acquire a measurement data group. One measurement data group is configured to include captured images acquired at substantially the same time and sensor data (geomagnetism $m^s_k$, acceleration $a^s_k$, and angular velocity $\omega^s_k$) which is the origin of the IMU orientation $q^{s2w}_k$. Hereinafter, a derivation order of the rotational matrix $R_{cam2imu}$ expressing the spatial relationship between the camera 60 and the IMU 71, including acquisition of the measurement data group, will be specifically described.

Figure 7:
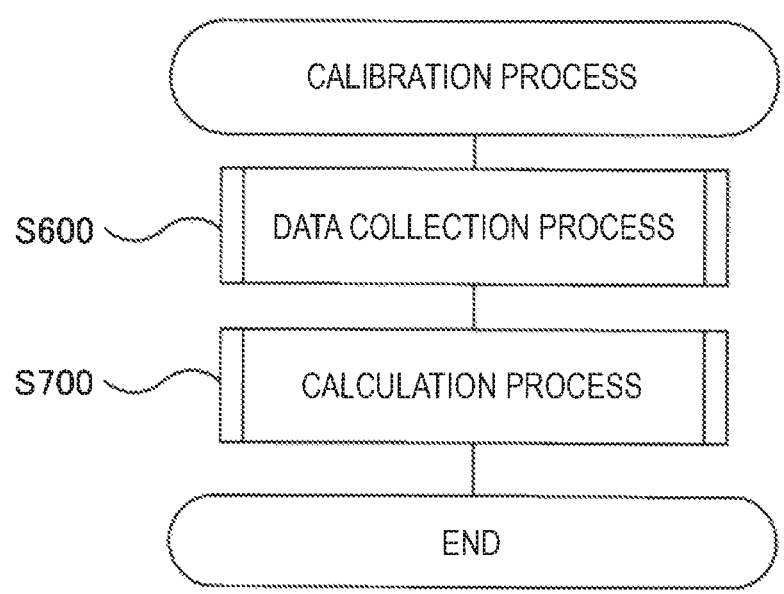
FIG. 7 is a flowchart illustrating a calibration process generally, according to an embodiment.

FIG. 7 is a flowchart illustrating a calibration process. The calibration process is performed to obtain the rotational matrix $R_{cam2imu}$. The processor 167, or the CPU 140, executes a program stored in the ROM 121 using an instruction from a user as a trigger to realize the calibration process. The calibration process is configured to include a data collection process (S600) and a calculation process (S700), described below.

In a case in which the camera 60 and the IMU 71 are rotated from a certain static position A (initial position) to another static position B (first and second positions), a change in a rotational angle satisfies the following equation (d). The static positions are positions defined on the world coordinate system. $R_{cam2imu}$ of the following equation is a rotational matrix from the camera 60 to the IMU 71, as described above.

$$R_{camA2B} = R_{cam2imu}^{-1} R_{imuA2B} R_{cam2imu} \qquad (d)$$

$R_{camA2B}$ is a rotational angle of the camera 60 changed in a case in which the camera 60 is rotated from the position A to the position B. That is, $R_{camA2B}$ is a rotational matrix from a first pose which is a pose of the camera 60 at the position A to a second pose which is a pose of the camera 60 at the position B.

$R_{imuA2B}$ is a rotational angle of the IMU 71 changed in a case in which the IMU 71 is rotated from the position A to the position B. That is, $R_{imuA2B}$ is a rotational matrix from a pose of the IMU 71 at the position A to a pose of the IMU 71 at the position B. Further, in other words, $R_{imuA2B}$ indicates a difference between a first pose which is a pose of the IMU 71 at the position A and a second pose which is a pose of the IMU 71 at the position B.

A process of deriving Equation (d) will be described below. A change in the rotational angle of the camera in a case in which the camera 60 and the IMU 71 are displaced from the position A to the position B is calculated by the following equation.

$$R_{camA2B} = R_{cam2world}^{-1}(B) R_{cam2world}(A) \qquad (e)$$

$R_{cam2world}$ (A) can be obtained from a first captured image which is a captured image at the position A. $R_{cam2world}$ (B) can be obtained from a second captured image which is a captured image at the position B. In such calculation, the nomography matrix is used, as described above. When the homography matrix is used, a pose of a planar marker with respect to the camera 60 can be derived. The real marker MK is a planar marker.

Similarly, an IMU rotational angle is calculated by the following equation.

$$R_{imuA2B} = R_{imu2world}^{-1}(B) R_{imu2world}(A) \qquad (f)$$

$R_{imu2world}$ is the IMU orientation $q^{s2w}_k$ and can also be ascertained as a rotational matrix from the IMU coordinate system to the world coordinate system. $R_{imu2world}(A)$ can be calculated from the IMU orientation $q^{s2w}_k$ at the position A. $R_{imu2world}$ (B) can be calculated from the IMU orientation $q^{s2w}_k$ at the position B.

Further, the following two equations are formed based on an assumption that the IMU reported positions should correlate with the camera reported positions.

$$R_{cam2world}(A) = R_{imu2world}(A) R_{cam2imu} \qquad (g)$$

$$R_{cam2world}(B) = R_{imu2world}(B) R_{cam2imu} \qquad (h)$$

When Equation (h) is derived to Equation (e), the following equation is obtained.

$$R_{camA2B} = (R_{imu2world}(B) R_{cam2imu})^{-1} R_{cam2world}(A) \qquad (i)$$

When Equation (g) is derived to Equation (i), the following equation is obtained.

$$R_{camA2B} = (R_{imu2world}(B) R_{cam2imu})^{-1} R_{imu2world}(A) R_{cam2imu} \qquad (j)$$
$$= R_{cam2imu}^{-1} R_{imu2world}^{-1}(B) R_{imu2world}(A) R_{cam2imu}$$

When Equation (f) is derived to Equation (j), Equation (d) is obtained.

$R_{cam2imu}$ can be obtained using Equation (d). A specific calibration method in the embodiment is based on nonlinear optimization for repeatedly causing $R_{cam2imu}$ to be higher precision. For the purpose of the repeated high precision, an initial estimated value of $R_{cam2imu}$ is first necessary. The initial estimated value may be a rough estimated value from design or use. For example, the following equation can be used to obtain the initial estimated value of $R_{cam2imu}$.

$$R_{cam2imu} = \begin{bmatrix} 1 & 0 & 0 \\ 0 & -1 & 0 \\ 0 & 0 & -1 \end{bmatrix} \qquad (l)$$

$R_{cam2world}$ is obtained from a marker tracking algorithm. Then, $R_{camA2B}$ is expressed in Equation (e). Thus, $R_{camA2B}$ expressed using $R_{cam2world}$ obtained from the marker tracking algorithm is notated as $R_{camA2B}^{Obs}$. That is, $R_{camA2B}^{Obs}$ is based on measurement and is expressed by the following equation.

$$R_{camA2B}^{Obs} = R_{cam2world}^{-1}(B) R_{cam2world}(A) \qquad (k)$$

On the other hand, $R_{camA2B}$ calculated from Equation (d) is notated as $R_{camA2B}^{Pred}$. That is, $R_{camA2B}^{Pred}$ is the predicted value and expressed by the following equation.

$$R_{camA2B}^{Pred} = R_{cam2imu}^{-1} R_{imuA2B} R_{cam2imu} \qquad (l)$$

When an error between $R_{camA2B}^{Obs}$ and $R_{camA2B}^{Pred}$ is small, precision of Equation (d) which is the origin of $R_{camA2B}^{Pred}$ is high. The fact that the precision of Equation (d) is high means that precision of $R_{cam2imu}$ is high. Accordingly, the following equation for obtaining an angle between measured rotation and predicted rotation is defined as an error measurement equation.

$$e = a\cos((\mathrm{trace}(R_{camA2B}^{Obs} * (R_{camA2B}^{Pred})') - 1) * 0.5) \qquad (m)$$

When the rotational matrix $R_{cam2imu}$ in which the value of e decreases can be obtained, the rotational matrix $R_{cam2imu}$ appropriately describes a spatial relationship between the camera 60 and the IMU 71. Moreover, when e exceeds a predetermined threshold, the processor 167 or CPU 140 can send a non-calibration signal indicating that the camera 60 and IMU 71 are not sufficiently calibrated.

In some embodiments, sensor data is rejected if it is of poor quality, in order to prevent calibration based on low-quality data. A quality measurement function Q(data) is calculated. The quality of the measurement data group is evaluated by the quality measurement function Q(data). Q(data) is decided from both of the IMU orientation $q^{s2w}_k$ and the marker pose. That is, Q(data) is a function of the IMU orientation $q^{s2w}_k$ and the marker pose, in other words, a function of the measurement data group. Specifically, the quality measurement function Q(data) outputs a value to determine whether one certain measurement data group and another measurement data group are reliable. One certain measurement data contains a data pair. Hereinafter, one certain measurement data and another measurement data group are also collectively referred to as data pairs.

In a case in which there is a high level of noise in the IMU orientation $q^{s2w}_k$ (for example, a case in which a spike or a random value is detected), the quality of data is poor. When a motion of a user is faster, the quality of the IMU orientation $q^{s2w}_k$ is worse. In a case in which there is jitter (or jittering) in several views or there is motion blur in the captured image, the quality of the captured image deteriorates and the acquired marker pose may not be reliable.

In a case in which the IMU orientation $q^{s2w}_k$ is poor or a case in which the marker pose is not reliable, the value of Q(data) is small. For example, a data pair included in a measurement data group for a view is not reliable in a case in which an angle different is not sufficiently large or a case in which a time difference is considerably large.

For example, Q(data) can be defined in the following equation.

$$Q(\mathrm{data}) = a * S t\mathrm{dev}(\mathrm{IMU}_{data})/C_{IMU} + b * \mathrm{AngleMarkerPose}(\mathrm{data})/C_{AngleMarker\,Pose} + c * \mathrm{AngleIMU}(\mathrm{data})/C_{AngleIMU} \qquad (n)$$

Here, a, b, and c are weighting coefficients. Stdev (IMU$_{data}$) is a standard deviation of the IMU orientation $q^{s2w}_k$ and measures stability of the IMU orientation $q^{s2w}_k$. AngleMarkerPose (data) is an angle between two marker poses. This angle is acquired from two captured images included in the data pair. AngleIMU (data) is an angle between two IMU orientations $q^{s2w}_k$. $C_{AngleMarkerPose}$, and $C_{AngleIMU}$ are normalization constants.

Subsequently, it is determined whether Q(data) is greater than a threshold Qth. In a case in which Q(data) is equal to or less than the threshold Qth, the process returns. In this case, the pair of acquired data is discarded.

In a case in which Q(data) is greater than the threshold Qth, Q(data) is good, and thus the data is inserted into a corresponding field of view. That is, the marker pose and the IMU orientation $q^{s2w}_k$ are stored in association with the corresponding view.

The calculation process according to the embodiment is configured to include a plurality of calculations and will be described without using a flowchart. In the calculation process according to the embodiment, optimization is performed to reduce an error of the calibration by defining a nonlinear cost function and minimizing the defined cost function. An energy function using the Gauss-Newton method is used as the cost function. A cost function E using the Gauss-Newton method is expressed in the following equation using e of Equation (m).

$$E = \sum_{i=1}^{M} [\varepsilon_i(r)]^2 \qquad (2)$$

This method is started from an initial estimated value and is progressed by repeated calculation by the following equation.

$$r^n = r^{n-1} + \Delta r \qquad (o)$$

Here, the increment $\Delta r$ is a solution of a normal equation. In Equation (2), e is expressed in the following equation using a Jacobian matrix $J_r$ of e.

$$e = -J_r \Delta r \qquad (p)$$

The Jacobian matrix $J_r$ is a function of r, and therefore can be described as J(r) as follows.

$$J_r = J(r) = \partial e / \partial r \qquad (q)$$

In order minimize a sum of squares of the Gauss-Newton method, the following equation may be solved.

$$\min \| e + J_r \Delta r \| \qquad (r)$$

The increment $\Delta r$ is calculated by the following equation.

$$\Delta r = -(J_r^T J_r)^{-1} J_r^T e \qquad (s)$$

One purpose of the embodiment is to estimate the rotational matrix $R_{cam2imu}$. The rotational matrix can generally be expressed using Eulerian angles. Specifically, the rotational matrix is expressed in the following equation.

$$R = Rz(\gamma) * Ry(\beta) * Rx(\alpha) \qquad (t)$$

$$Rx = \begin{bmatrix} 1 & 0 & 0 \\ 0 & \cos\alpha & -\sin\alpha \\ 0 & \sin\alpha & \cos\alpha \end{bmatrix}, \quad Ry = \begin{bmatrix} \cos\beta & 0 & \sin\beta \\ 0 & 1 & 0 \\ -\sin\beta & 0 & \cos\beta \end{bmatrix}, \qquad (3)$$

$$Rz = \begin{bmatrix} \cos\gamma & -\sin\gamma & 0 \\ \sin\gamma & \cos\gamma & 0 \\ 0 & 0 & 1 \end{bmatrix}$$

As a result, $R_{cam2imu}$ is expressed in the following equation.

$$R_{cam2imu} = Rz(\gamma) * Ry(\beta) * Rx(\alpha) \qquad (u)$$

In the embodiment, an unknown r is defined from Equation (u) in the following equation.

$$r = [\alpha, \beta, \gamma] \qquad (v)$$

Accordingly, Equation (q) can be expressed as follow.

$$J(r) = [\partial e / \partial \alpha, \partial e / \partial \beta, \partial e / \partial \gamma] \qquad (w)$$

Accordingly, optimum $R_{cam2imu}$ can be decided by optimizing r.

Equation (q) can be modified into the following equation.

$$J(r) = \left[\frac{\partial E}{\partial r}\right] = \begin{bmatrix} \frac{\partial e_1}{\partial r} \\ \frac{\partial e_2}{\partial r} \\ \vdots \\ \frac{\partial e_i}{\partial r} \\ \vdots \\ \frac{\partial e_M}{\partial r} \end{bmatrix} \qquad (4\text{-}1)$$

$$\left[\frac{\partial e_i}{\partial r}\right] = \frac{\partial}{\partial r}(\text{acos}(\text{trace}(R^{Obs}_{camA2B} * (R^{Pred}_{CamA2B})') - 1) * 0.5) \qquad (4\text{-}2)$$

Differential of a composite function of an arc cosine is generally expressed in the following equation.

$$\frac{\partial}{\partial r}\text{acos}(x) = \frac{-1}{\sqrt{1-x^2}} \cdot \frac{\partial x}{\partial r} \qquad (5)$$

Here, when x is defined in the following equation, Equation (5) is equal to the double of Equation (4-2). The reason why Equation (5) is doubled is that *0.5 included in Equation (4-2) is ignored. Even when the constant factor (*0.5) is ignored, there is no influence on the optimization of r. Therefore, *0.5 is ignored below.

$$x = (\text{trace}(R_{CamAtoB}^{Obs} * (R_{CamAtoB}^{Pred})') - 1) \cdot 0.5 \qquad (6)$$

$R_{camA2B}^{Obs}$ is not a function of r. Accordingly, $\partial x/\partial r$ included in Equation (5) becomes the following equation from Equation (6).

$$\frac{\partial x}{\partial r} = \text{trace}\left(R^{Obs}_{camA2B} * \left(\frac{\partial R^{Pred}_{camA2B}}{\partial r}\right)'\right) \qquad (7)$$

Partial differential included in the right side of Equation (7) becomes the following equation from Equation (d). In the following equation and Equations (12), (13), and (14) to be described below, $R_{cam2imu}^{-1}$ is the same matrix as $R_{cam2imu}'$, $R_{cam2imu}^{-1}$ is an inverse matrix of $R_{cam2imu}$, and $R_{cam2imu}'$ is a transposed matrix of $R_{cam2imu}$.

$$\frac{\partial R^{Pred}_{camA2B}}{\partial r} = \frac{\partial}{\partial r}(R_{cam2imu}^{-1} R_{imuA2B} R_{cam2imu}) \qquad (8)$$

$$= \frac{\partial R_{cam2imu}^{-1}}{\partial r} R_{imuA2B} R_{cam2imu} +$$

$$R_{cam2imu}^{-1} R_{imuA2B} \frac{\partial R_{cam2imu}}{\partial r}$$

$\partial R_{cam2imu}/\partial r$ included in Equation (8) is expressed in the following equation from Equation (u).

$$\partial R_{cam2imu}/\partial r = \partial \{Rz(\gamma)*Ry(\beta)*Rx(\alpha)\}/\partial r \quad (x)$$

In regard to the previous equation, $\alpha$ included in r is expressed in the following equation.

$$\partial R_{cam2imu}/\partial \alpha = Rz(\gamma)*Ry(\beta)*\partial \{Rx(\alpha)\}/\partial \alpha \quad (y)$$

$\partial \{Rx(\alpha)\}/\partial \alpha$ included in the previous equation is expressed in the following equation from Equation (3).

$$\frac{\partial}{\partial \alpha} Rx(\alpha) = \begin{bmatrix} 1 & 0 & 0 \\ 0 & -\sin\alpha & -\cos\alpha \\ 0 & \cos\alpha & -\sin\alpha \end{bmatrix} \quad (9)$$

$\beta$ included in r is expressed in the following equation.

$$\partial R_{cam2imu}/\partial \beta = Rz(\gamma)*\partial \{Ry(\beta)\}/\partial \beta * Rx(\alpha) \quad (z)$$

$\partial \{Ry(\beta)\}/\partial \beta$ included in the previous equation is expressed in the following equation from Equation (3).

$$\frac{\partial}{\partial \beta} Ry(\beta) = \begin{bmatrix} -\sin\beta & 0 & \cos\beta \\ 0 & 0 & 0 \\ -\cos\beta & 0 & -\sin\beta \end{bmatrix} \quad (10)$$

$\gamma$ included in r is expressed in the following equation.

$$\partial R_{cam2imu}/\partial \gamma = \partial \{Rz(\gamma)\}/\partial \gamma * Ry(\beta)\beta * Rx(\alpha) \quad (aa)$$

$\partial \{Rz(\gamma)\}/\partial \gamma$ included in the previous equation is expressed in the following equation from Equation (3).

$$\frac{\partial}{\partial \gamma} Rz(\gamma) = \begin{bmatrix} -\sin\gamma & -\cos\gamma & 0 \\ \cos\gamma & -\sin\gamma & 0 \\ 0 & 0 & 0 \end{bmatrix} \quad (11)$$

The following equation is established from Equations (4-2), (5), (6), and (7).

$$\frac{\partial e}{\partial \alpha} = \frac{-1}{\sqrt{1-x^2}} * \text{trace}\left\{ R_{camA2B}^{Obs} * \left( \frac{\partial R_{cam2imu}^{-1}}{\partial \alpha} R_{imuA2B} R_{cam2imu} \right)' + R_{camA2B}^{Obs} * \left( R_{cam2imu}^{-1} R_{imuA2B} \frac{\partial R_{cam2imu}}{\partial \alpha} \right)' \right\} \quad (12)$$

$\partial R_{com2imu}/\partial \alpha$ is calculated by Equations (y) and (9). Further, the cases of $\beta$ and $\gamma$ are the same as the case of $\alpha$, as will be indicated below. $\partial R_{com2imu}/\partial \beta$ is calculated by Equations (z) and (10). $\partial R_{com2imu}/\partial \gamma \beta$ is calculated by Equations (aa) and (11).

$$\frac{\partial e}{\partial \beta} = \frac{-1}{\sqrt{1-x^2}} * \text{trace}\left\{ R_{camA2B}^{Obs} * \left( \frac{\partial R_{cam2imu}^{-1}}{\partial \beta} R_{imuA2B} R_{cam2imu} \right)' + R_{camA2B}^{Obs} * \left( R_{cam2imu}^{-1} R_{imuA2B} \frac{\partial R_{cam2imu}}{\partial \beta} \right)' \right\} \quad (13)$$

$$\frac{\partial e}{\partial \gamma} = \frac{-1}{\sqrt{1-x^2}} * \text{trace}\left\{ R_{camA2B}^{Obs} * \left( \frac{\partial R_{cam2imu}^{-1}}{\partial \gamma} R_{imuA2B} R_{cam2imu} \right)' + R_{camA2B}^{Obs} * \left( R_{cam2imu}^{-1} R_{imuA2B} \frac{\partial R_{cam2imu}}{\partial \gamma} \right)' \right\} \quad (14)$$

As described above, $J_r$ can be calculated from the collected data and the initial estimated value of $R_{cam2imu}$, and further Equation (r) can be solved. When Equation (r) is solved, optimum $R_{cam2imu}$ can be decided.

According to the embodiment, a solution related to user-friendly setup available offline is realized for the IMU-camera calibration. In the solution, it is not necessary for a user to align planar targets vertically and the second IMU is not necessary. Instead, the real marker MK is used. In several embodiments, a calibration procedure with an automatic user-friendly guide ensures completion of data collection in all of the operation range.

That is, according to several embodiments, neither a vertically aligned pattern nor the second IMU is necessary. This prevents a difficult procedure of the user carefully aligning the pattern relative to gravity. The user can simply set up and use the method of the embodiments. Further, overall precision is improved by supplying a procedure with a user-friendly guide and reliably collecting data obtained in all of the operation range.

In a case the real marker MK is disposed horizontally or vertically (e.g. disposed on a horizontal table or vertical wall), a cost function is modified in the following equation.

$$E = \sum_{i=1}^{n} [\alpha * w_i \text{trace}(R_{camA2B}^{Obs}, R_{camA2B}^{Pred}) + \beta * w_i \quad (16)$$
$$\{1 - \cos(\theta_{i1}(V_{i1imu}, V_{i1marker})) + 1 - \cos(\theta_{i2}(V_{i2imu}, V_{i2marker}))\}]$$

In Equation (16), $V_{i1IMU}$ and $V_{i2IMU}$ are vertical measured values (vectors) by the IMU 71. Here, i indicates an i-th data pair and include measurements (i1 and i2) of two positions. $V_{i1marker}$ and $V_{i2marker}$ are corresponding measured values (vectors) by the camera 60, are derived from vanishing points of a certain scene, and can be calculated from a marker pose. $\theta_{i1}$ is an angle between the two vectors $V_{i1IMU}$ and $V_{i1Marker}$. $\alpha$ and $\beta$ are weighting coefficients. $\alpha+\beta=1$ is satisfied.

In a case in which the marker is not present on a horizontal surface or a vertical surface, $\beta$ is set to zero and $\alpha$ is set to 1. In this case, Equation (16) becomes the same as Equation (15).

The above described methods represent a significant improvement in the technological field of head-mounted displays by greatly simplifying the process of post-production or end-user calibration. Existing end-user calibration systems require the user to collect large amounts of sensor and image data (e.g. at every possible position of the HMD). Thus, the methods described herein can be accomplished much more quickly resulting in greater user satisfaction. These methods can still achieve highly precise results, which are important in the field of AR, as latency and inaccuracy is highly noticeable and undesirable for users.

Figure 8:
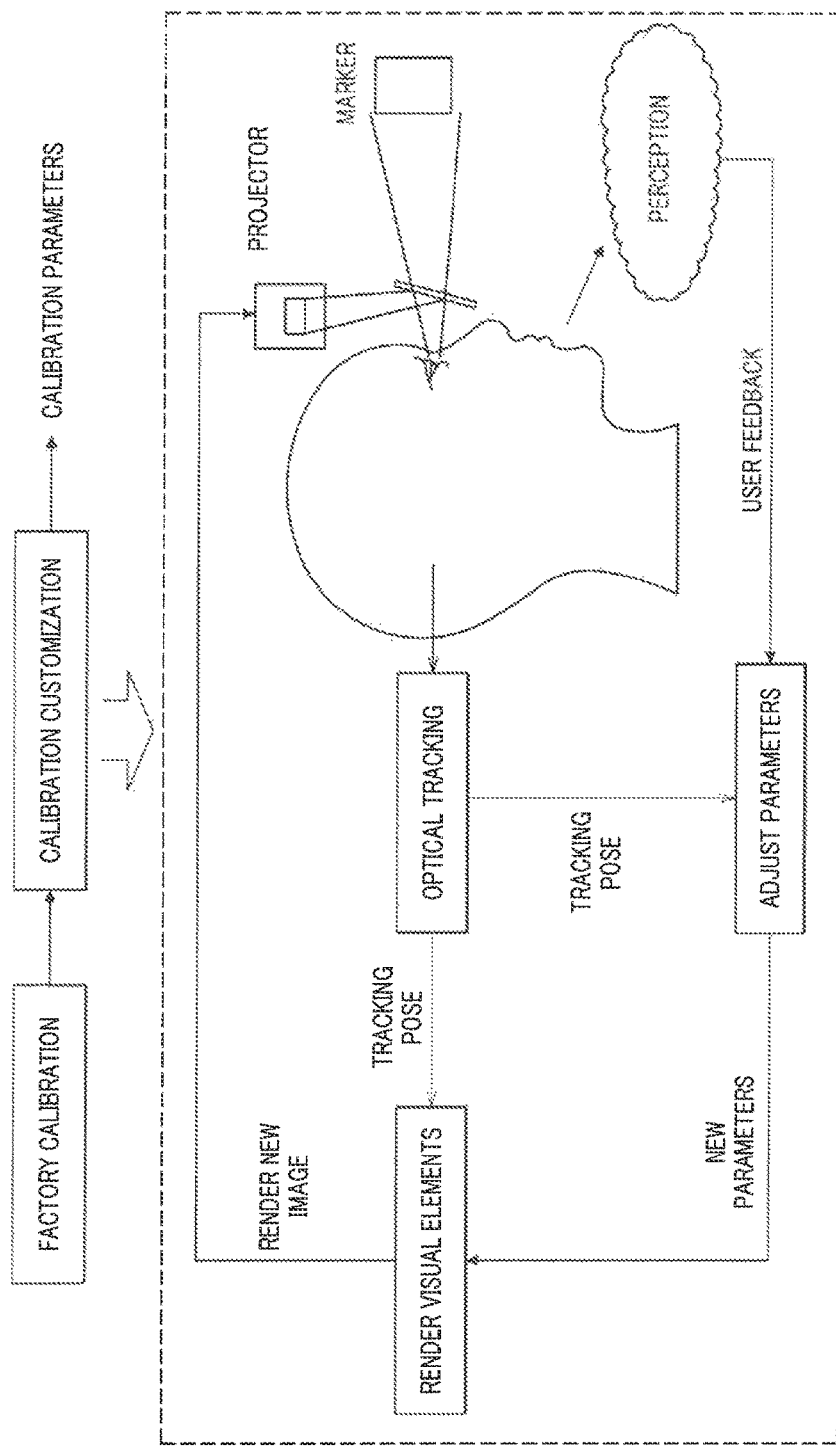
FIG. 8 is a diagram of a system and method of performing a calibration process according to an embodiment.

Custom calibration is shown in the flowchart in FIG. 8. In FIG. 8, the user is using the HMD including a projector which projects a display image. The user is viewing the real marker MK (or "marker") and the display image simultaneously to perform calibration. Based on the calibration program, the user perceives that calibration is needed between the camera 60 and IMU 71.

The user then provides feedback, such as by activating a button that sends a signal to the CPU 140 on whether the user perceives calibration or not.

Then, the CPU 140 adjusts calibration parameters based on signal indicating the user's feedback and the tracking pose (location data) provided from the optical tracking (using the image data as discussed herein). It is noted that this step is discussed in more detail below with regard to steps S1110 and S1112 of FIG. 11.

Figure 10:
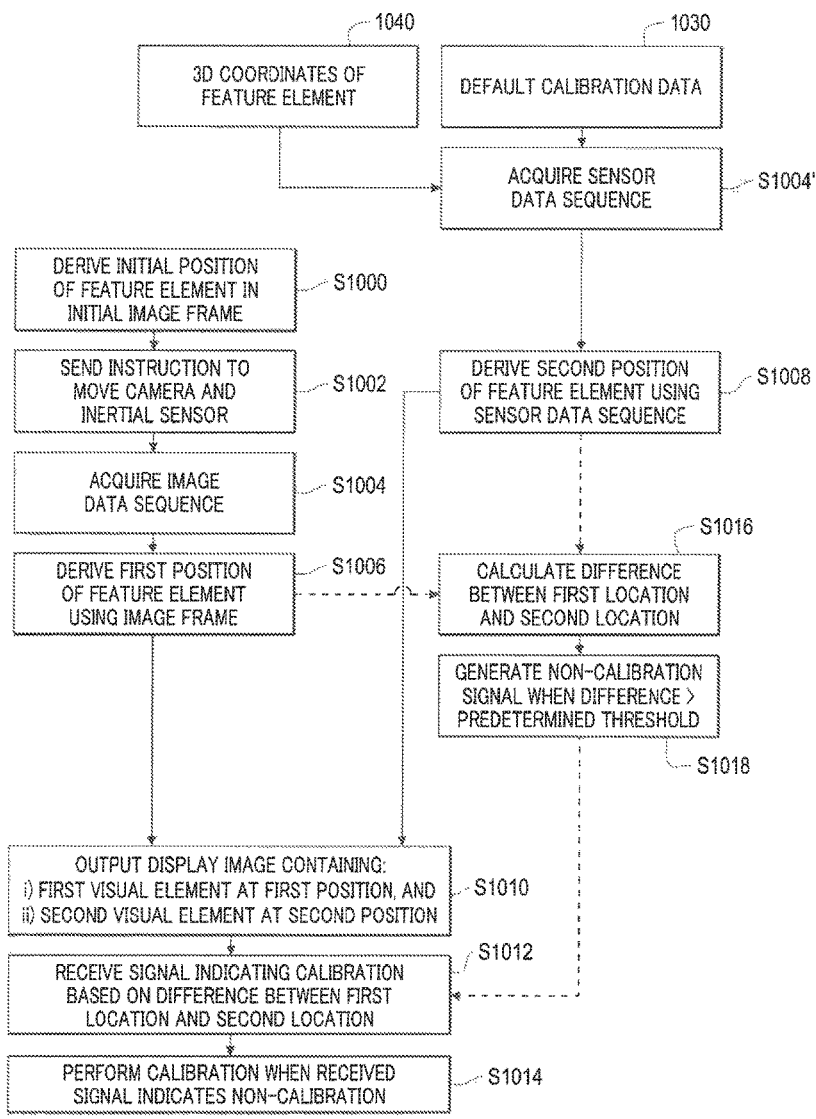
FIG. 10 is a flowchart of a calibration process according to an embodiment.
Figure 11:
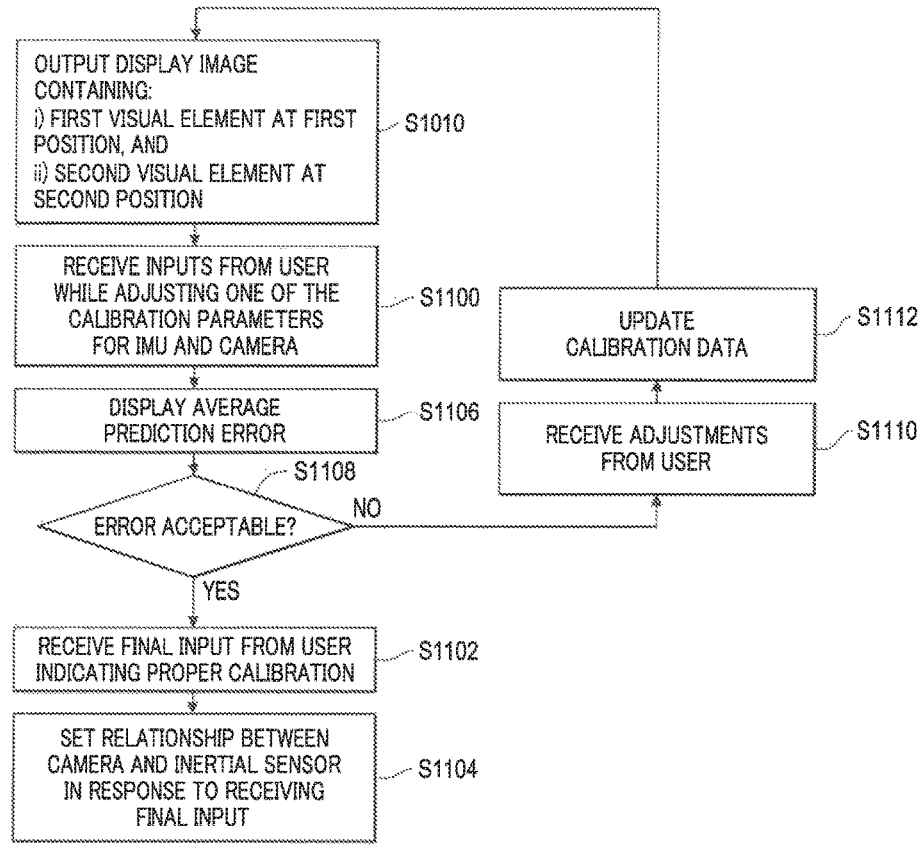
FIG. 11 is a flowchart showing calibration as an iterative process according to an embodiment.

The new parameters and the optical tracking are then used to render an updated visual element for the calibration process (S1010 in FIG. 11), and the process is repeated until the user (or the CPU 140) is satisfied with the level of calibration (S1108 in FIG. 11). A more detailed explanation of the calibration process is discussed below with regard to FIGS. 10 and 11.

FIG. 10 shows a method of calibrating a relationship between camera 60 and IMU 71 according to one embodiment. In S1000, CPU 140 locates the real marker MK in an initial image frame and an initial position of the real marker MK is determined based on the initial image frame. In step S1002, CPU 140 instructs the user to move the HMD 100, such as by using the user's head, thereby moving camera 60 and IMU 71. Alternatively, step S1002 may simply be the user moving his head without instruction from the CPU 140.

In any event, subsequent to S1002, CPU 140 collects an image data sequence (i.e. a sequence of image frames) using camera 60 (step S1004), while simultaneously collecting a sensor data sequence (i.e. a series of observed sensor positions) from IMU 71 (step S1004'). The sensor data sequence is acquired based on default calibration data 1030 and the three-dimensional coordinates of the feature element 1040 (i.e. the location in the field of view of the real marker MK), as understood by the CPU 140, as discussed herein. The image data sequence and sensor data sequence may then be stored in ROM 121 and/or RAM 122.

After acquiring the image data sequence, CPU 140 then derives a first position of the real marker MK using the observed position in the current image frame (step S1006). This process is discussed herein later.

In step S1008, CPU 140 derives a second position of the real marker MK by predicting the position based on the sensor data sequence. These steps and the algorithms used to calculate this predicted position are described in more detail later herein.

In some embodiments and referring to FIG. 12, if the level of non-calibration is sufficiently high (i.e. the distance 1220 between first visual element 1200 and second visual element 1210 is too high, as discussed in detail with respect to FIG. 12 below), the user and the CPU 140 may perform calibration. This calibration is performed according to steps S1016 and S1018 in FIG. 10. Specifically, CPU 140 calculates the distance between the first location and the second location, and generates a non-calibration signal (indicating that calibration should be performed), if the distance is higher than a predetermined threshold. This threshold is one minute of arc in some embodiments, and ten minutes of arc in other embodiments.

Even through IMU-Camera calibration parameters among different units of the same device may be different, the difference will usually be small. Therefore, for each device, its default calibration data is obtained offline by: performing an offline IMU camera calibration for any one unit of the device; or getting it from the CAD model of the device. "default calibration data" in 1030 in FIG. 10 is obtained in this way. In some embodiments, the device or head-mounted display 100 includes a storage medium 121 containing a first spatial relationship between the camera 60 and the inertial sensor 71 that was derived using: images of a real marker MK in a first and a second pose taken using the head-mounted display 100 or another device, and a difference in pose between the first pose and the second pose acquired based on inertial sensor output of the head-mounted display 100 or another device. This first spacial relationship in the storage medium is the "default calibration data." In online IMU camera calibration, the calibration parameters will be refined/optimized using the user feedback data and the IMU Camera calibration method such as the method above described. Thus, the user can improve on the pre-stored calibration of the HMD 100 after purchase, and improve the tracking performance of the HMD 100.

In some embodiments, the user performs the actual calibration by adjusting values within the $R_{cam2imu}$ matrix. First, a user is shown a display of visual elements on the real marker MK, such as the one shown in FIG. 12. In this view, a first visual element 1200 and a second visual element 1210 are shown, while the real marker MK is still visible to the user. The first visual element 1200 and the second visual element 1210 are virtual images displayed to the user and overlaid on the external environment viewed by the user. In this embodiment, the first visual element 1200 and the second visual element 1210 resemble the real marker MK. The first visual element 1200 is displayed at the first position $x_{dis\_1}$, which is based on the location of the real marker MK in the field of view based on the image data collected by camera 60.

$$x_{dis\_1} = P T_{Cam2Disp} T_{Marker2Cam} X$$

Where P is the projection matrix and $T_{Cam2Disp}$ is the 3D transformation matrix from the camera coordinate system to the display coordinate system. $T_{Marker2Cam}$ represents the 3D pose (including the position) of the real marker MK in the camera coordinate system, which is obtained from the image frames. X represents each 3D point included in the 3D model corresponding to the real marker MK expressed in the 3D model coordinate system, which is stored in the memory of the HMD 100. In this embodiment, $T_{Marker2Cam} X$ corresponds to the first position. The second visual element 1210 is displayed at the second position $x_{dis\_2}$, which is based on a location predicted based on sensor data from IMU 71 (step S1010 in FIG. 10).

$$x_{dis\_2} = P T_{Cam2Disp} T_{IMU2Cam} T_{Global2IMU} T_{Marker2Global} X$$

where $T_{Marker2Ground}$
$T_{Marker2Global} = T_{IMU2Global(0)} * T_{Cam2IMU} * T_{Marker2Cam(0)}$
$T_{Marker2Cam(0)}$ and $T_{IMU2Global(0)}$ are maker pose and IMU pose record in the very beginning of the calibration process and when the user is static for a period of time (e.g. a second). Assuming accelerometer data at the moment is (ax, ay, az), then $T_{IMU2Global(0)}$ is calculated by the following equations.

$$\tan(\text{roll}) = \tan\left(\frac{ay}{az}\right)$$

$$\tan(\text{pitch}) = \tan\left(\frac{-ax}{ay * \sin(\text{roll}) + az * \cos(\text{roll})}\right)$$

$$\text{yaw} = 0$$

$$R_x(\text{roll}) = \begin{bmatrix} 1 & 0 & 0 \\ 0 & \cos(\text{roll}) & \sin(\text{roll}) \\ 0 & -\sin(\text{roll}) & \cos(\text{roll}) \end{bmatrix}$$

$$R_y(\text{pitch}) = \begin{bmatrix} \cos(\text{pitch}) & 0 & -\sin(\text{pitch}) \\ 0 & 1 & 0 \\ \sin(\text{pitch}) & 0 & \cos(\text{pitch}) \end{bmatrix}$$

$$R_z(\text{yaw}) = \begin{bmatrix} \cos(\text{yaw}) & \sin(\text{yaw}) & 0 \\ -\sin(\text{yaw}) & \cos(\text{yaw}) & 0 \\ 0 & 0 & 1 \end{bmatrix}$$

$$R_{IMU2Global(0)} = (R_x * R_y * R_z)'$$

$$T_{IMU2Global(0)} = \begin{bmatrix} R_{S2G} & 0_3 \\ 0 & 0 & 0 & 1 \end{bmatrix}$$

$T_{IMU2Global}$ is the predicted IMU pose with respect to the global coordinate system defined, for example, on the earth. $T_{IMU2Cam}^{TIMU2Cam}$ (or its inversion) is the most updated IMU-Camera (or Camera-IMU) calibration parameters obtained. In this embodiment, $T_{IMU2Cam}T_{Global2IMU}T_{Marker2Global}X$ corresponds to the second position. At this point, a separation 1220 between the first visual element 1200 and the second visual element 1210 is determined as a distance 1220 between the first visual element 1200 and the second visual element 1210 (or components thereof), as shown in FIG. 12. If the relationship between the camera 60 and IMU 71 were perfectly calibrated, the first visual element 1200 and the second visual element 1210 would completely overlap, indicating no separation (not shown). However, in the embodiment shown in FIG. 12, the relationship between the camera 60 and the IMU 71 may not yet be calibrated and the two visual elements are skewed. In one embodiment, the degree of separation 1220 between the first visual element 1200 and the second visual element 1210 indicates non-calibration between camera 60 and IMU 71 if the separation 1220 is greater than a predetermined threshold.

If the user determines that the degree of separation 1220 (or distance between first and second visual elements 1200 and 1210) is too high (e.g., being greater than a predetermined threshold, greater than desired a visual inspection), the user may adjust parameters within the $R_{cam2imu}$ matrix, as described in FIGS. 11 and 12 below. To do this, the user may activate a control or input (e.g., pressing a button) which sends a signal that is received by the CPU 140 (step S1012 in FIG. 10). This can be achieved by manipulating an input on operation section 135. Subsequently, calibration is performed (step S1014 in FIG. 10), which is described further in FIGS. 11 and 12.

FIG. 11 is a flowchart explain in more detail the steps S1010 to S1014 according to one embodiment. In step S1100 of FIG. 11, CPU 140 receives control or inputs via the user while adjusting one or more parameters of a relationship therebetween (or at least one of the camera 60 or IMU 71). In this embodiment, a prediction error level is displayed to the user in S1106 to notify them of the reliability of the data. Step S1100 could include displaying the first visual element 1200 or the second visual element 1210 in adjusted positions in response to the user adjusting parameters using, e.g., a graphical-user interface and/or operation section 135. For example, the user may adjust a virtual or physical slide bar for angular distance in a direction, which may result in moving the second visual element 1210 on the display.

The adjustable parameters include rotation angles in three axes (e.g. X, Y, and Z) in some embodiments. The adjustable parameters also include translational parameters in three axis in another embodiment. However, the adjustable parameters could be variables in a different coordinate system, such as a spherical or Cartesian coordinate system. The adjustable parameters may also include non-spatial parameters such as sensor gain, acceleration, and the aggressiveness of a location prediction algorithm. These parameters can be changed using an input device, such as controls on a graphical-user interface and/or operation section 135. The user may adjust the rotation angle for each of the three axes individually to determine if the separation 1220 is reduced. Once a rotation angle for an axis is optimized (meaning that that the separation 1220 is least among all rotation angles), the user then optimizes the rotation angle for the other two axes. Once the rotation angles for all axes are optimized, the separation 1220 should be reduced to zero and thus, the first and second visual elements should overlap with each other, indicating calibration in some embodiments. However, calibration does not require that the first and second visual elements should overlap with each other and instead, calibration could be an iterative process to determine an acceptable separation 1220. In S1112, the calibration parameters will be optimized and updated based on the IMU and camera data collected so far using the calibration method described above with the user input as the initial calibration parameters.

In this regard, if the user performs a calibration and is not satisfied with the results based on visual inspection or the separation 1220 is determined to be greater than a predetermined threshold, the user may perform the calibration again. This process is continued until the desired separation 1220 is achieved, such as if the separation 1220 is determined to be less than or equal to a predetermined threshold, and then the method proceeds to step S1102.

In S1102, a final calibration input is received from the user, indicating that calibration is complete. This may occur after the user successfully overlays the first visual element 1200 and the second visual element 1210 or otherwise adjusting the first visual element 1200 and the second visual element 1210 to have a separation less than or equal to a threshold by adjusting parameters.

In S1104, after S1102 indicating calibration is complete, the CPU 140 saves new values for the $R_{cam2imu}$ matrix, which will be used in future computations of the camera/IMU relationship. This information can be saved in any storage medium, including the ROM 121, RAM 122, and/or identification target storage section 139. Thus, when the HMD 100 is, for example, tracking virtual objects on a moving real-world object, there will be less latency and better location accuracy because calibrated values are being used.

Figure 12:
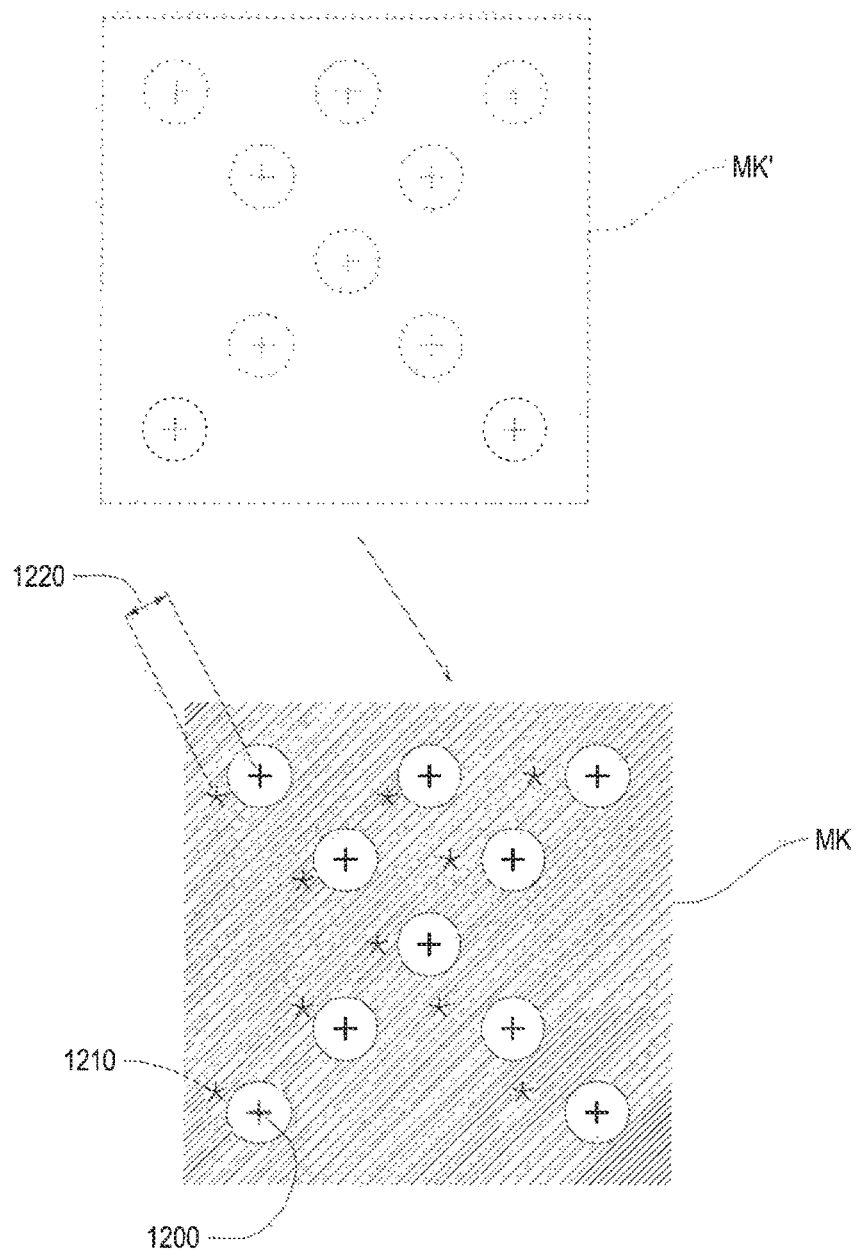
FIG. 12 is a diagram of a user display during calibration according to one embodiment.

FIG. 12 also shows marker location MK' which is the location of MK in the initial image frame. As can be seen in FIG. 12, the user has moved HMD 10 upward during the calibration. This movement has facilitated collection of sensor data, allowing CPU 140 to calculate the location of second visual element 1210. A visual element representing MK' may or may not be shown to the user in differing embodiments.

The display section 20 or operation section 135 may also display a numeric value corresponding to the distance between first visual element 1200 and second visual element 1210 (or individual components or vertices thereof). The display section 20 or operation section 135 may also display a prediction error level or sample noise level to the user to notify them of the reliability of the data. This error and noise of the data is discussed in more detail below.

The device to which the technology disclosed as an embodiment is applied may be an imaging device other than an HMD. For example, the device may be an imaging device that has no function of displaying an image.

Some embodiments provide a non-transitory storage medium (e.g. ROM 121, RAM 122, identification target storage section 139) containing program instructions that, when executed by a computer processor (e.g. CPU 140 or processor 167), perform the methods described herein.

Although the invention has been described with reference to embodiments herein, those embodiments do not limit the scope of the invention. Modifications to those embodiments or different embodiments may fall within the scope of the invention.

What is claimed is:

1. A method of calibrating a relationship between a camera and an inertial sensor in a fixed or adjustably fixed spatial relationship with the camera, of a head-mounted display, the head-mounted display having a storage medium containing a first spatial relationship between the camera and the inertial sensor, the method comprising:
   acquiring, from the camera, an image data sequence;
   acquiring, from the inertial sensor, a sensor data sequence;
   deriving by a processor, a marker pose of a marker in an earlier image frame in the image data sequence using the earlier image frame;
   deriving, by the processor, a first position of a feature element on the marker in a later image frame in the image data sequence using the later image frame;
   deriving, by the processor, a second position of the feature element on the marker corresponding to the later image frame using: i) the sensor data sequence, ii) the marker pose, iii) a 3D point of a model corresponding to the marker, and iv) the first spatial relationship;
   outputting, to a display, a display image containing: i) a first visual element at a first location corresponding to the first position, and ii) a second visual element at a second location corresponding to the second position;
   receiving a signal indicating whether the camera and inertial sensor are sufficiently calibrated based on a difference between the first location and the second location; and
   performing calibration when the received signal indicates that the camera and inertial sensor are not sufficiently calibrated.

2. The method of claim 1, further comprising:
   calculating, by the processor, the difference between the first location and the second location after displaying the display image; and
   generating, by the processor, a non-calibration signal indicating that the camera and inertial sensor are not sufficiently calibrated when the difference is higher than a predetermined threshold.

3. The method of claim 1, wherein the signal is received from a user of the head-mounted display.

4. The method of claim 1, wherein calibration is performed by adjusting a stored relationship between sensor data from the inertial sensor and image data from the camera.

5. The method of claim 4, wherein the stored relationship includes rotational relationships on three axes.

6. The method of claim 4, wherein the performing calibration comprises:
   receiving inputs from a user of the head-mounted display while adjusting one of the camera or inertial sensor;
   receiving a final input from the user indicating proper calibration; and
   setting the stored relationship in response to receiving the final input.

7. The method of claim 4, wherein the adjustment is performed by the processor.

8. The method of claim 1, further comprising:
   sending an instruction to move the camera and inertial sensor before the first and second positions of the feature element on the marker are derived.

9. A non-transitory storage medium containing a first spatial relationship between a camera and an inertial sensor in a fixed or adjustably fixed spatial relationship with the camera, the non-transitory storage medium further containing program instructions that, when executed by a computer processor, cause the computer processor to perform a method, the method comprising:
   acquiring an image data sequence from a camera connected to the processor;
   acquiring a sensor data sequence from an inertial sensor that is connected to the processor;
   deriving a marker pose of a marker in an earlier image frame in the image data sequence using the earlier image frame;
   deriving a first position of a feature element on the marker in a later image frame in the image data sequence using the later image frame;
   deriving a second position of the feature element on the marker corresponding to the later image frame using: i) the sensor data sequence, ii) the marker pose, iii) a 3D point of a model corresponding to the marker, and iv) the first spatial relationship;
   displaying, with a display connected to the processor, a display image containing: i) a first visual element at a first location corresponding to the first position, and ii) a second visual element at a second location corresponding to the second position;
   receiving a signal indicating whether the camera and inertial sensor are sufficiently calibrated based on a difference between the first location and the second location.

10. The non-transitory storage medium of claim 9, wherein the method further comprises:
    performing calibration when a non-calibration signal is received indicating that the camera and inertial sensor are not sufficiently calibrated.

11. The non-transitory storage medium of claim 10, wherein calibration is performed by adjusting a stored relationship between sensor data from the inertial sensor and image data from the camera.

12. The non-transitory storage medium of claim 11, wherein the stored relationship includes rotational relationships on three axes.

13. The non-transitory storage medium of claim 11, wherein the performing calibration comprises:
    receiving inputs from a user of the camera and inertial sensor while adjusting one of the camera or inertial sensor;
    receiving a final input from the user indicating proper calibration; and
    setting the stored relationship in response to receiving the final input.

14. The non-transitory storage medium of claim 9, wherein the method further comprises:
    sending an instruction to move the camera and inertial sensor before the first and second positions of the feature element on the marker are derived.

15. The non-transitory storage medium of claim 9, wherein the method further comprises:

calculating the difference between the first location and the second location after displaying the display image; and generating a non-calibration signal indicating that the camera and inertial sensor are not sufficiently calibrated when the difference is higher than a predetermined threshold.

16. The non-transitory storage medium of claim 9, wherein the signal is received from a user of the camera and inertial sensor.

17. A head-mounted display device comprising:
a camera;
an inertial sensor in a fixed or adjustably fixed first spatial relationship with the camera;
a storage medium containing a first spatial relationship between the camera and the inertial sensor;
a display; and
a processor configured to:
  acquire an image data sequence from the camera;
  acquire a sensor data sequence from the inertial sensor;
  derive a marker pose of a marker in an earlier image frame in the image data sequence using the earlier image frame;
  derive a first position of a feature element on the marker in a later image frame in the image data sequence using the later image frame;
  derive a second position of the feature element on the marker corresponding to the later image frame using: i) the sensor data sequence, ii) the marker pose, iii) a 3D point of a model corresponding to the marker, and iv) the first spatial relationship;
  display, with the display, a display image containing: i) a first visual element at a first location corresponding to the first position, and ii) a second visual element at a second location corresponding to the second position;
  receive a signal indicating whether the camera and inertial sensor are sufficiently calibrated based on a difference between the first location and the second location; and
  perform calibration when the received signal indicates that the camera and inertial sensor are not sufficiently calibrated.

18. The head-mounted display device of claim 17, wherein the processor is further configured to:
perform calibration when a non-calibration signal is received indicating that the camera and inertial sensor are not sufficiently calibrated.

19. The head-mounted display device of claim 17, wherein the processor is further configured to:
calculate the difference between the first location and the second location after displaying the display image; and
generate a non-calibration signal indicating that the camera and inertial sensor are not sufficiently calibrated when the difference is higher than a predetermined threshold.

20. The head-mounted display device of claim 17, wherein the signal is received from a user of the head-mounted display device.

* * * * *